(12) United States Patent
Frenne et al.

(10) Patent No.: US 8,971,907 B2
(45) Date of Patent: Mar. 3, 2015

(54) NETWORK NODE, USER EQUIPMENT AND METHODS THEREIN

(75) Inventors: Mattias Frenne, Uppsala (SE); Sorour Falahati, Stockholm (SE); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/502,243

(22) PCT Filed: Mar. 14, 2012

(86) PCT No.: PCT/SE2012/050281
§ 371 (c)(1), (2), (4) Date: Apr. 16, 2012

(87) PCT Pub. No.: WO2013/070137
PCT Pub. Date: May 16, 2013

(65) Prior Publication Data
US 2014/0274087 A1    Sep. 18, 2014

Related U.S. Application Data

(60) Provisional application No. 61/558,383, filed on Nov. 10, 2011.

(51) Int. Cl.
*H04W 88/02* (2009.01)
*H04L 5/00* (2006.01)
*H04L 1/00* (2006.01)
(Continued)

(52) U.S. Cl.
CPC ............ *H04L 5/0037* (2013.01); *H04L 1/0057* (2013.01); *H04L 1/04* (2013.01); *H04L 1/0625* (2013.01); *H04L 1/0668* (2013.01)
USPC ....................................... 455/452.1

(58) Field of Classification Search
USPC ........ 370/311, 329, 330, 335, 537; 455/453.1
See application file for complete search history.

(56) References Cited

U.S. PATENT DOCUMENTS

2011/0080880 A1  4/2011 Yin et al.
2012/0269138 A1* 10/2012 Han et al. ...................... 370/329
(Continued)

OTHER PUBLICATIONS

3GPP TSG RAN WG1 #66 meeting; Zhuhai, China; Source: Mitsubishi Electric; Title: Comparison of transmit diversity schemes for PUCCH Format 3 (R1-113442), Oct. 10-14, 2011.
(Continued)

*Primary Examiner* — Diane Mizrahi
(74) *Attorney, Agent, or Firm* — Baker Botts, LLP

(57) ABSTRACT

A method in a user equipment for arranging a Physical Uplink Control Channel, PUCCH, transmission to a network node in a telecommunications system is provided. The PUCCH transmission comprises control information for downlink transmissions. The control information is Reed-Müller, RM, encoded using at least two RM codewords and transmitted using Alamouti encoded transmit diversity over at least two antenna ports. The control information comprises a first bit sequence and a second bit sequence. The user equipment arranges the first bit sequence and the second bit sequence, such that at least two bits from the first bit sequence and second bit sequence, that subsequently are Alamouti encoded together, originates from the same RM codeword of the at least two RM codewords. This is performed in order to enable control information encoded using one RM codeword to be processed independently from control information encoded using another RM codeword at the network node.

17 Claims, 20 Drawing Sheets

(51) Int. Cl.
*H04L 1/04* (2006.01)
*H04L 1/06* (2006.01)

(56) References Cited

U.S. PATENT DOCUMENTS

2012/0294272 A1* 11/2012 Han et al. .................. 370/329
2013/0039334 A1* 2/2013 Han et al. .................. 370/330

OTHER PUBLICATIONS

3GPP TSG RAN WG1 #66 bis; Zhuhai, China; Agenda Item: 7.2.1.4; Source: LG Electronics; Title: Transmit Diversity Schemes on PUCCH Format 3 for Rel-11 (R1-113184), Oct. 10-14, 2011.

* cited by examiner

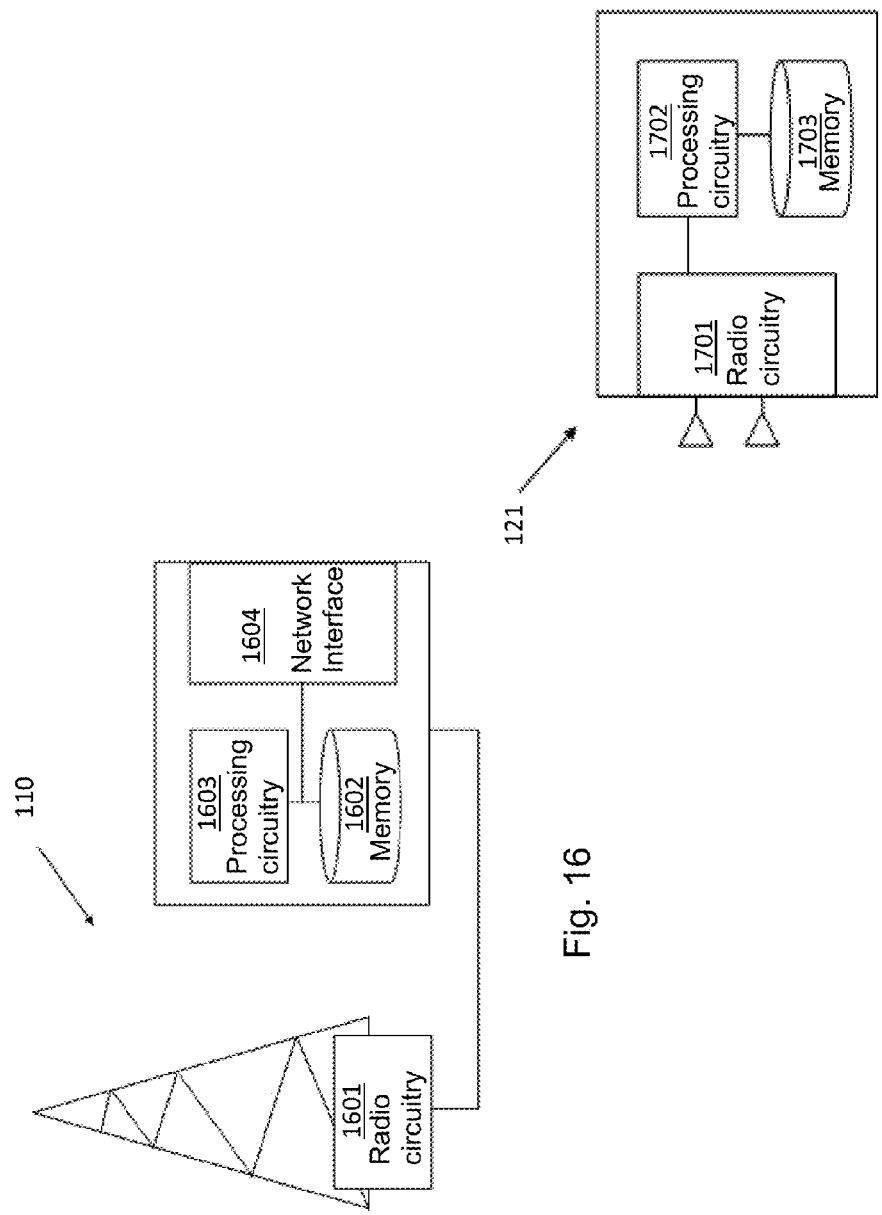

NETWORK NODE, USER EQUIPMENT AND METHODS THEREIN

This application is the U.S. national phase of International Application No. PCT/SE2012/050281 filed 14 Mar. 2012 which designated the U.S. and claims priority to U.S. Provisional Application No. 61/558,383 filed 10 Nov. 2011, the entire contents of each of which are hereby incorporated by reference.

TECHNICAL FIELD

Embodiments herein relate to a network node, a user equipment and methods therein. In particular, embodiments herein relate to arranging and receiving a Physical Uplink Control Channel (PUCCH) transmission in a telecommunications network.

BACKGROUND

In a typical cellular radio system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

3 GPP Long Term Evolution (LTE) uses orthogonal frequency division multiplexing (OFDM) in the downlink and Discrete Fourier Transform (DFT)-spread OFDM in the uplink. The basic LTE downlink physical resource may thus be seen as a time-frequency grid as generally illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized sub-frames of length $T_{sub-frame}=1$ ms, as generally illustrated in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, e.g., in each sub-frame the base station transmits control information about to which user equipments data is transmitted and upon which resource blocks the data is transmitted, in the current downlink sub-frame. This control signalling is typically transmitted in the first 1, 2, 3 or 4 OFDM symbols in each sub-frame. A downlink system with 3 OFDM symbols as control is generally illustrated in FIG. 3.

LTE uses hybrid-Automatic Repeat Request (HARQ), where, after receiving downlink data in a sub-frame, the user equipment attempts to decode it and reports to the base station whether the decoding was successful (Acknowledge, ACK) or not (Not acknowledge, NACK). In case of an unsuccessful decoding attempt, the base station may retransmit the erroneous data.

Uplink control signalling from the user equipment to the base station generally comprises:
- hybrid-ARQ acknowledgements for received downlink data.
- user equipment reports related to the downlink channel conditions, used as assistance for the downlink scheduling.
- scheduling requests, indicating that a user equipment needs uplink resources for uplink data transmissions.

If the user equipment has not been assigned an uplink resource for data transmission, the Layer1/Layer2 (L1/L2) control information, such as, channel-status reports, hybrid-ARQ acknowledgments, and scheduling requests, is transmitted in uplink resources, i.e. resource blocks, specifically assigned for uplink L1/L2 control on Rel-8 Physical Uplink Control CHannel (PUCCH). As illustrated in FIG. 4, these resources are located at the edges of the total available cell bandwidth. Each such resource consists of 12 "subcarriers", that is, one resource block, within each of the two slots of an uplink sub-frame. In order to provide frequency diversity, these frequency resources are frequency hopping on the slot boundary, i.e. one "resource" consists of 12 subcarriers at the upper part of the spectrum within the first slot of a sub-frame and an equally sized resource at the lower part of the spectrum during the second slot of the sub-frame or vice versa. If more resources are needed for the uplink L1/L2 control signalling, e.g. in case of very large overall transmission bandwidth supporting a large number of users, additional resources blocks may be assigned next to the previously assigned resource blocks.

The reasons for locating the PUCCH resources at the edges of the overall available spectrum are two-fold:
- Together with the frequency hopping described above, this maximizes the frequency diversity experienced by the control signalling.
- Assigning uplink resources for the PUCCH at other positions within the spectrum, i.e. not at the edges, would have fragmented the uplink spectrum, making it impossible to assign very wide transmission bandwidths to single user equipment and still retain the single-carrier property of the uplink transmission.

The bandwidth of one resource block during one sub-frame is too large for the control signalling needs of a single user equipment. Therefore, to efficiently exploit the resources set aside for control signalling, multiple user equipments may share the same resource block. This is done by assigning the different user equipments different orthogonal phase rotations of a cell-specific length-12 frequency-domain sequence and/or different orthogonal time-domain covers covering the sub-frames within a slot or sub-frame.

PUCCH Format 3

When carrier aggregation is used in LTE, one uplink carrier is designed to carry the HARQ-ACK/NACK bits for all DL carrier PDSCH transmissions. To enable the possibility to transmit more than four bits of A/N, PUCCH Format 3 may be used. The basis for Format 3 is DFT-precoded OFDM, see FIG. 5. The signalling to configure PUCCH Format 3 with transmit diversity and the corresponding ACK/NACK transmission is shown in FIG. 6.

If the number of ACK/NACK bits is up to 11, then the multiple ACK/NACK bits, which may also include scheduling request (SR) bits, are Reed-Müller (RM) encoded to form 48 coded bits. The coded bits are then scrambled with cell-specific sequences. 24 bits are transmitted within the first slot and the other 24 bits are transmitted within the second slot. The 24 bits per slot are converted into 12 quadrature phase shift keying (QPSK) symbols, spread across five DFT-spread (DFTS)-OFDM symbols using an orthogonal cover code, DFT precoded and transmitted within one resource blocks (bandwidth) and five DFTS-OFDM symbols (time). The spreading sequence is UE-specific and enables multiplexing of up to five users within the same resource blocks. For the reference signals, cyclic shifted CAZAC sequences, e.g. the computer optimized sequences, are used. To improve orthogonality among reference signals even further, an orthogonal cover code of length two may be applied to the reference signals. However, this is not used in LTE Rel.10.

If the number of ACK/NACK bits exceeds 11, then the bits are split into two parts and two RM encoders are used, one for each part respectively. This is known as the dual-RM code. Up to 20 ACK/NACK bits, plus one SR bit, may therefore be supported by PUCCH Format 3. Each encoder in the dual-RM code outputs 24 bits which are converted to 12 QPSK symbols per slot and the two sets of 12 QPSK symbols are interleaved over the subcarriers so that the first encoder maps (It shall be noted that in the "map to . . . " operation a cell, slot and symbol specific cyclic shift of the symbols in time domain is included as to provide inter-cell interference randomization) its 12 symbols onto odd subcarriers and the second encoder onto even subcarriers, where 6 odd and 6 even sub-carriers are assumed per slot. The 12 QPSK symbols per slot are then spread across the five DFTS-OFDM symbols using one out of five orthogonal cover codes, as in the single-RM code case. Details of the encoding and multiplexing are shown in FIG. 7 and FIG. 8, respectively where in FIG. 8 the following algorithm is used in the Dual Codeword Combiner operation in which $\tilde{b}_0, \tilde{b}_1, \tilde{b}_2, \ldots, \tilde{b}_{23}$ is the output sequence from the first encoder and $\tilde{\tilde{b}}_0, \tilde{\tilde{b}}_1, \tilde{\tilde{b}}_2, \ldots, \tilde{\tilde{b}}_{23}$ the output sequence from the second encoder and $N_{sc}^{RB}=12$, the number of subcarriers per resource block.

The output bit sequence $b_0, b_1, b_2, \ldots, b_{B-1}$ where $B=4 \cdot N_{sc}^{RB}$ is obtained by the alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ as follows:

```
Set i, j = 0
while i < 4 · N_sc^RB
    b_i = b̃_j,
    b_{i+1} = b̃_{j+1}
    b_{i+2} = b̃̃_j,
    b_{i+3} = b̃̃_{j+1}
    i = i + 4,
    j = j + 2,
end while
```

PUCCH Format 3 Diversity with Space Time or Space Frequency Encoded Transmit Diversity Using an Alamouti encoder to provide transmit diversity is well known and there are solutions on how to apply this to the PUCCH Format 3.

When combined with single-carrier frequency division multiple access (SC-FDMA), the well-known Alamouti scheme may be applied within a SC-FDMA symbol, on the six pairs of modulation symbols before the DFT operation, as depicted in FIG. 9 and also shown in FIG. 10.

The QPSK modulated symbol $s_i$ and $s_{i+1}$ are Alamouti encoded together according to the Alamouti code to form a Space Time Block Code (STBC):

$$\begin{pmatrix} s_i & s_{i+1} \\ s_{i+1}^* & -s_i^* \end{pmatrix}$$

It is also possible to perform the Alamouti encoding on the DFT precoded symbols, before the IFFT in form of a space frequency block code (SFBC). However, then the single carrier property is lost and therefore has the modified SFBC been introduced. The Alamouti scheme may be modified as depicted in FIG. 12 in order to guarantee the same cubic metric (CM) as STBC on both transmit antennas, see FIG. 11. Cubic metric (CM) is a measurement on how much intermodulation distortion the signal produces when amplified in a non-ideal (non-linear) power amplifier.

In practice, the 12 sub-carriers are divided into two groups of 6 sub-carriers, and within each group the Alamouti scheme is applied on the first sub-carrier and the sixth sub-carrier, on the second sub-carrier and the fifth sub-carrier and on the third sub-carrier and the fourth sub-carrier. Here again, performance degradation due to channel frequency selectivity may arise as the frequency distance between symbols jointly encoded by the SFBC increases but this degradation will be limited thanks to the small bandwidth of PUCCH.

A problem with the above earlier disclosed procedures is coverage of the PUCCH Format 3 transmissions. A further problem is the increased detection complexity with joint detection of the two dual RM encoded codewords when transmit diversity is used, as illustrated at least in part by the Actions 1301-1308 in FIG. 13.

In Action 1301-1302, a set 1 of n1 number of information bits are encoded using a codeword 1, and a set 2 of n2 number of information bits are encoded using a codeword 2.

In Action 1303, the sequences may then be combined and interleaved, by alternating the symbols from the first and second decoder, as shown in FIG. 8.

In Action 1304, the sequences may be transmit pre-processed or transmit diversity encoded as shown in FIG. 10 and FIG. 11.

In Action 1305, the sequences may be transmit processed for antenna 1 and antenna 2, also shown in FIG. 10 and FIG. 11.

In Action 1306, a PUCCH Format 3 transmission to a network node may be performed.

In Action 1307, a network node may receive the PUCCH Format 3 transmission.

In Action 1308, the network node may perform a joint detection of the two encoded codewords 1 and 2 to obtain a detected joint sequence of set 1+set 2 comprising n1+n2 information bits.

This conventional transmit diversity joint RM codeword processing of the bit or symbol sequences in the network node detection will result in a detection complexity of $2^{n1+n2}$ number of hypotheses.

SUMMARY

It is an object of embodiments herein to provide a way of reducing detection complexity in a network node in a telecommunications system.

According to a first aspect of embodiments herein, the object is achieved by a method in a user equipment for arranging a Physical Uplink Control Channel, PUCCH, transmission to a network node in a telecommunications system. The PUCCH transmission comprises control information for use in downlink carrier transmissions. Furthermore, the control information is Reed-Müller, RM, encoded using at least two RM codewords and transmitted using Alamouti encoded transmit diversity over at least two antenna ports. Also, the control information comprises a first bit or symbol sequence and at least a second bit or symbol sequence. The user equipment arranges the first bit or symbol sequence and the at least second bit or symbol sequence, such that at least two bits or symbols from the first bit or symbol sequence and at least second bit or symbol sequences, that subsequently are Alamouti encoded together, originate from the same RM codeword of the at least two RM codewords. This is performed in order to enable control information encoded using one RM codeword to be processed independently from control information encoded using another RM codeword at the network node.

According to a second aspect of embodiments herein, the object is achieved by a user equipment for arranging a Physical Uplink Control Channel, PUCCH, transmission to a network node in a telecommunications system. The PUCCH transmission comprises control information for use in downlink carrier transmissions. Furthermore, the control information is Reed-Müller, RM, encoded using at least two RM codewords and transmitted using Alamouti encoded transmit diversity over at least two antenna ports. Also, the control information comprises a first bit or symbol sequence and at least a second bit or symbol sequence. The user equipment comprises a processing circuitry. The processing circuitry is configured to arrange the first bit or symbol sequence and at least second bit or symbol sequence, such that at least two bits or symbols from the first bit or symbol sequence and at least second bit or symbol sequences, that subsequently are Alamouti encoded together, originate from the same RM codeword of the at least two RM codewords. This is performed by the processing circuitry in order to enable control information encoded using one RM codeword to be processed independently from control information encoded using another RM codeword at the network node.

According to a third aspect of embodiments herein, the object is achieved by a method in a network node for receiving a Physical Uplink Control Channel, PUCCH, transmission from a user equipment in a telecommunications system. The PUCCH transmission comprises control information for use in downlink carrier transmissions. Furthermore, the control information is Reed-Müller, RM, encoded using at least two RM codewords and transmitted using Alamouti encoded transmit diversity over at least two antenna ports. The network node receives the PUCCH transmission from a user equipment via at least two antenna ports. It also processes the control information such that control information encoded using one RM codeword is processed independently from control information encoded using another RM codeword.

According to a fourth aspect of embodiments herein, the object is achieved by a network node for receiving a Physical Uplink Control Channel, PUCCH, transmission from a user equipment in a telecommunications system. The PUCCH transmission comprises control information for use in downlink carrier transmissions. Furthermore, the control information is Reed-Müller, RM, encoded using at least two RM codewords and transmitted using Alamouti encoded transmit diversity over at least two antenna ports. The network node comprises a processing circuitry. The processing circuitry is configured to receive the PUCCH transmission from a user equipment via at least two antenna ports. It is also configured to process the control information such that control information encoded using one RM codeword is processed independently from control information encoded using another RM codeword.

By arranging bit or symbol sequences as described above, the user equipment enables each bit or symbol sequence encoded using different RM codewords in the RM encoding to be processed independently in the network node for an Alamouti-encoded PUCCH transmit diversity scheme.

Thus, the complexity in the detection in the network node is reduced by having the network node processing each bit or symbol sequence independently based on the RM codeword used in the encoding of the respective bit or symbol sequence.

This may be exemplified in an embodiment in which a dual RM encoded transmission of control information using Alamouti encoding is performed from the user equipment over at least two (2) antenna ports. In this embodiment, assuming that the number of control information bits in the bit or symbol sequences input to each of the two RM encoders is n1 and n2, respectively, the number of hypotheses in the detection in the network node is $2^{n1}+2^{n2}$. This may be compared to $2^{n1+n2}$ number of hypotheses when using a conventional joint RM codeword processing of the bit or symbol sequences in a network node detection when transmit diversity is used. Thus, in this embodiment, since $2^{n1}+2^{n2}$ is significantly less than $2^{n1+n2}$, the complexity in the detection in the network node is reduced.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 16 is a schematic block diagram of embodiments of a network node, FIG. 17 is a schematic block diagram of embodiments of a user equipment.

DETAILED DESCRIPTION

Figure 1:
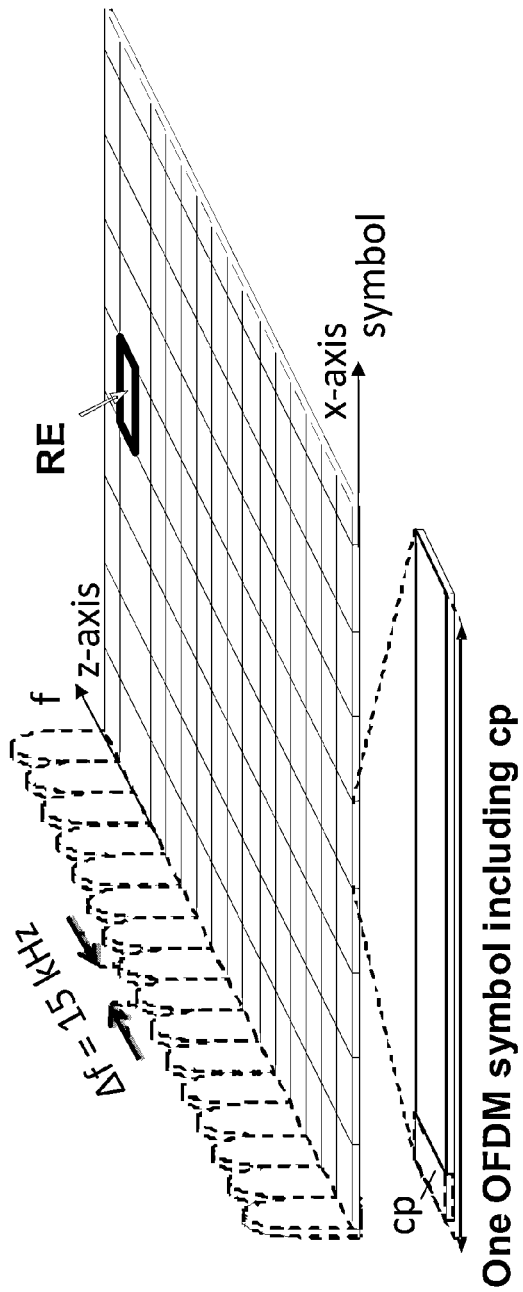
FIG. 1 is a diagrammatic view illustrating, e.g., LTE downlink physical resources.
Figure 2:
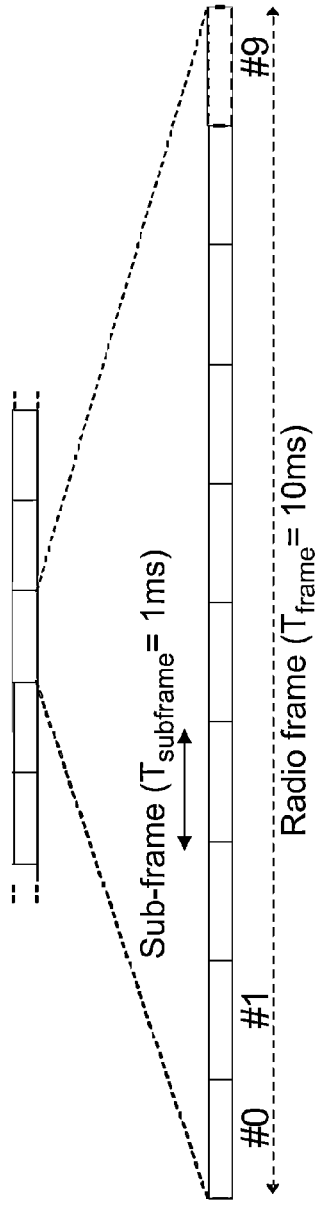
FIG. 2 is a diagrammatic view illustrating, e.g., LTE time-domain structure.
Figure 3:
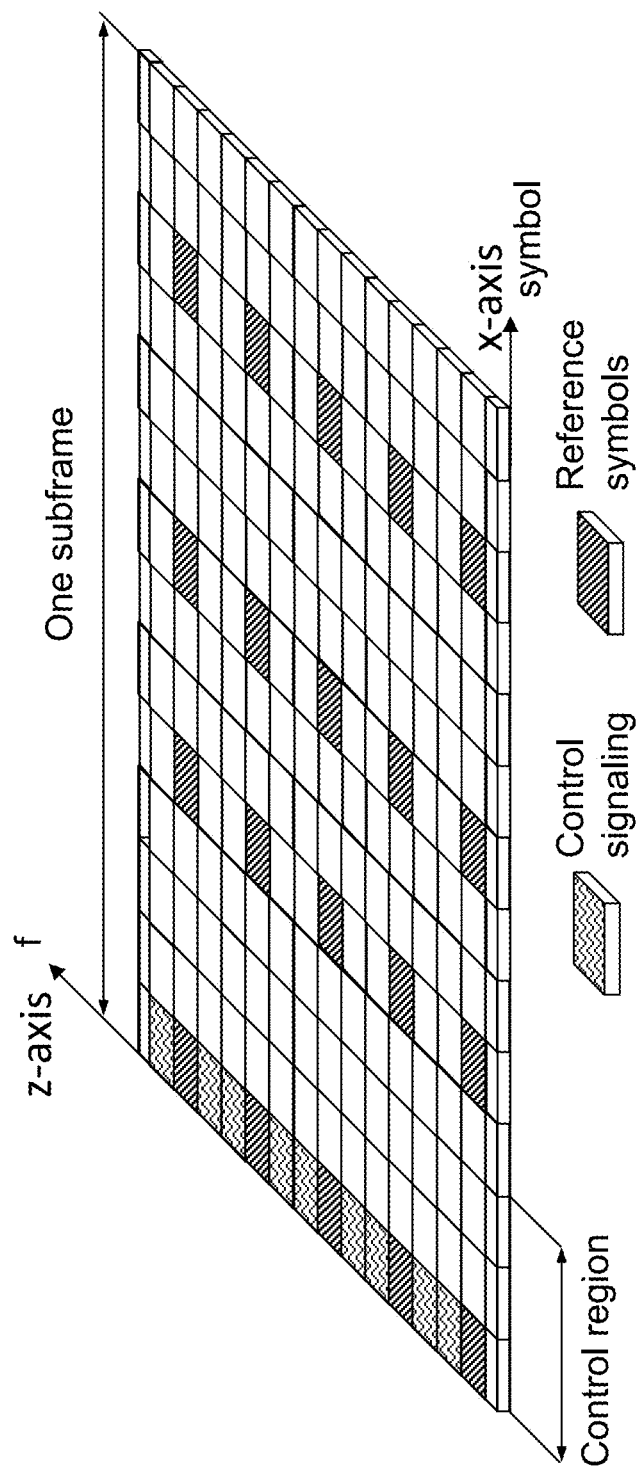
FIG. 3 is a diagrammatic view illustrating, e.g., a Downlink sub-frame.
Figure 4:
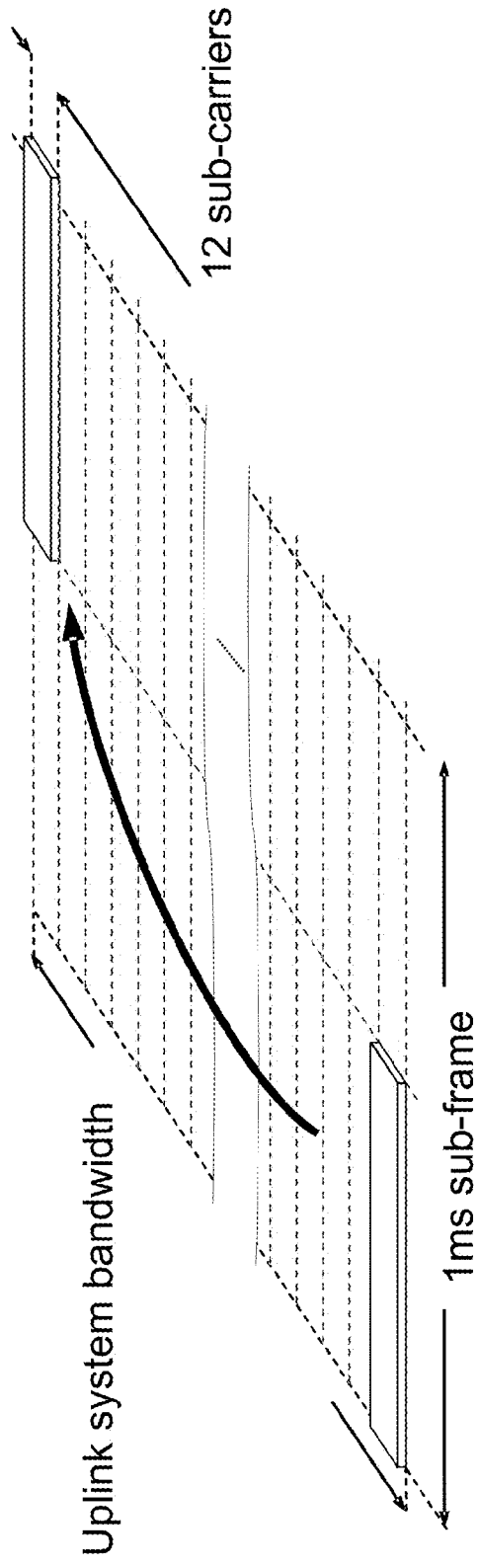
FIG. 4 is a diagrammatic view illustrating, e.g., uplink L1/L2 control signalling transmission on Rel-8 PUCCH.
Figure 5:
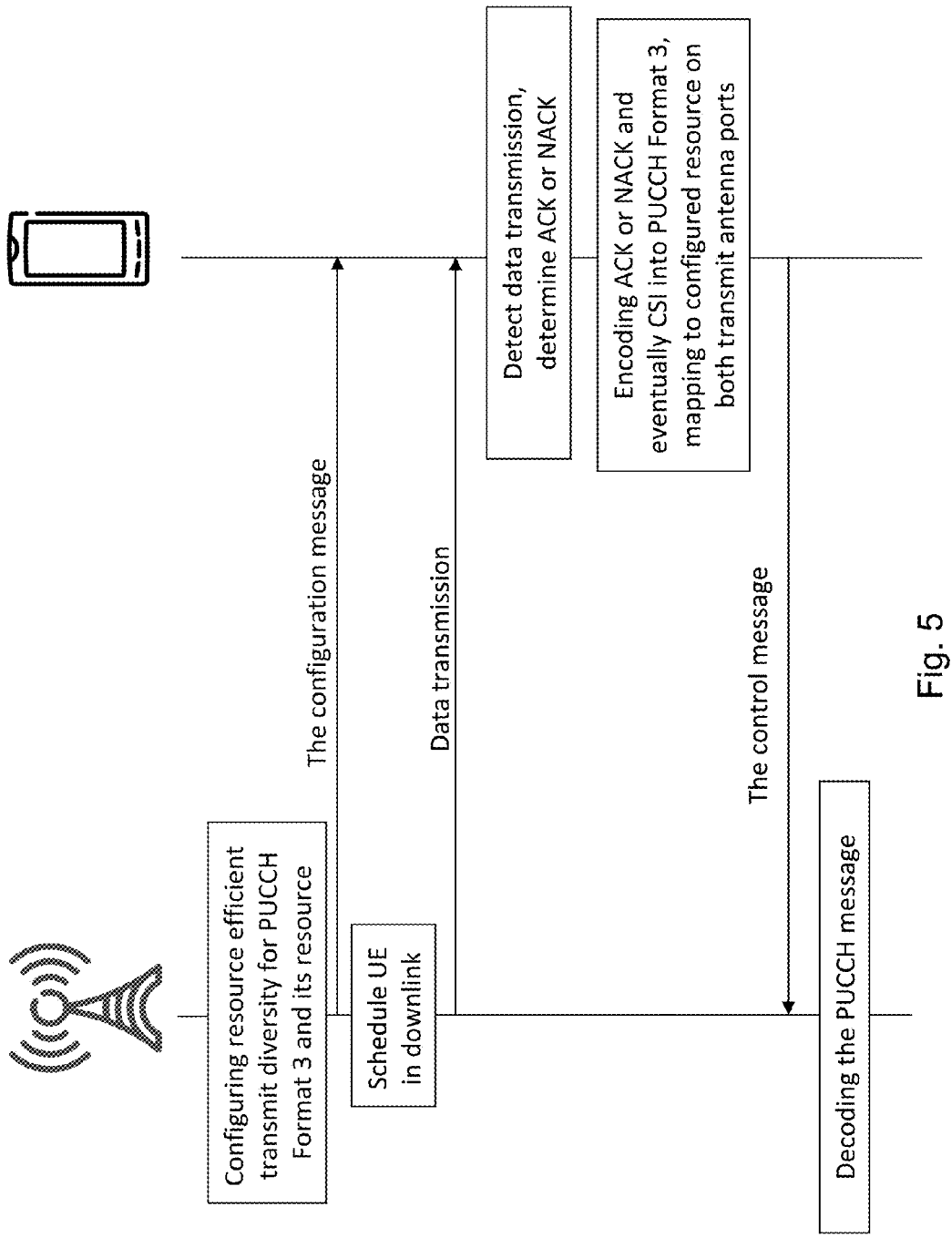
FIG. 5 is a diagrammatic view showing signalling to configure PUCCH Format 3 with transmit diversity and a corresponding ACK/NACK transmission.

The figures are schematic and simplified for clarity, and they merely show details which are essential to the understanding of the embodiments, while other details have been left out. Throughout, the same reference numerals are used for identical or corresponding parts or steps.

It should be noted that as part of the developing of the embodiments described herein, another problem has been identified which is also how to arrange PUCCH transmissions from the user equipment to allow the implementation of more advanced receivers in the network node in order to extend the uplink coverage of the PUCCH transmissions. The PUCCH transmissions here being dual RM encoded PUCCH transmissions with Alamouti encoded transmit diversity. Also, this should be performed without exploding the complexity in the receivers in the network node when the payload in the PUCCH transmissions increases.

Figure 14:
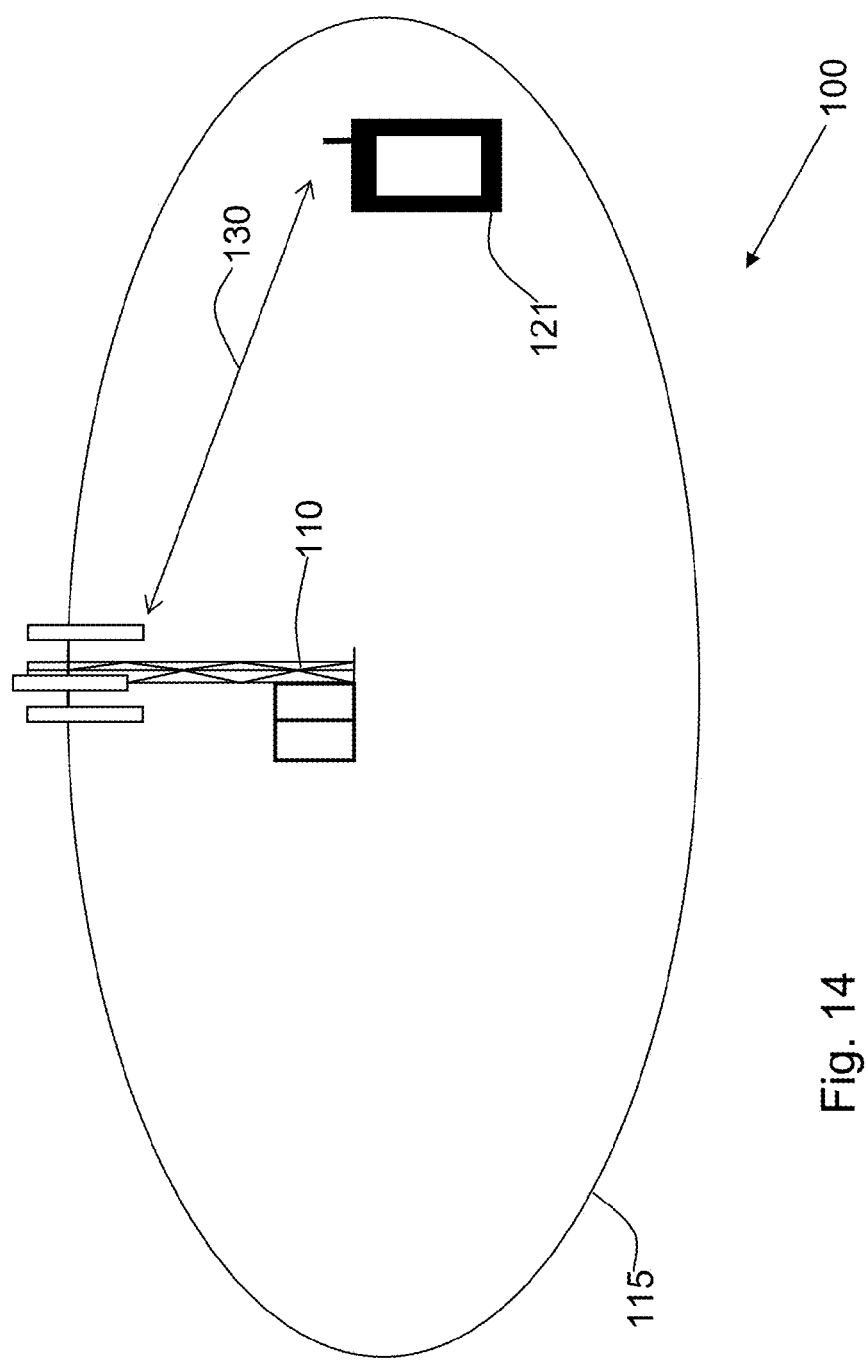
FIG. 14 is a schematic block diagram illustrating embodiments in a telecommunications system.

FIG. 14 depicts a telecommunications system 100 in which embodiments herein may be implemented. The cellular communications system 100 is a wireless communication network such as an LTE, WCDMA, GSM network, any 3GPP cellular network, or any cellular network or system.

The telecommunications system 100 comprises a base station which is a network node and is therefore referred to herein as the network node 110. The network node 110 serves a cell 115. The network node 110 may in this example e.g. be an eNB, eNodeB, or a Home Node B, a Home eNode B, femto Base Station (BS), pico BS or any other network unit capable to serve a user equipment or a machine type communication device in a telecommunications system.

A user equipment 121 is located within the cell 115. The user equipment 121 is configured to communicate within the telecommunications system 102 via the network node 110 over a radio link 130 when the user equipment 121 is present in the cell 115 served by the network node 110. Thereby, the user equipment 121 is capable of communicate with other user equipments located in the cell 115 and in other cells served by other network nodes.

Embodiments of a method in the user equipment 121 and embodiments of a method in a network node 110 will now be described with reference to the flowchart depicted in FIG. 15.

Figure 15:
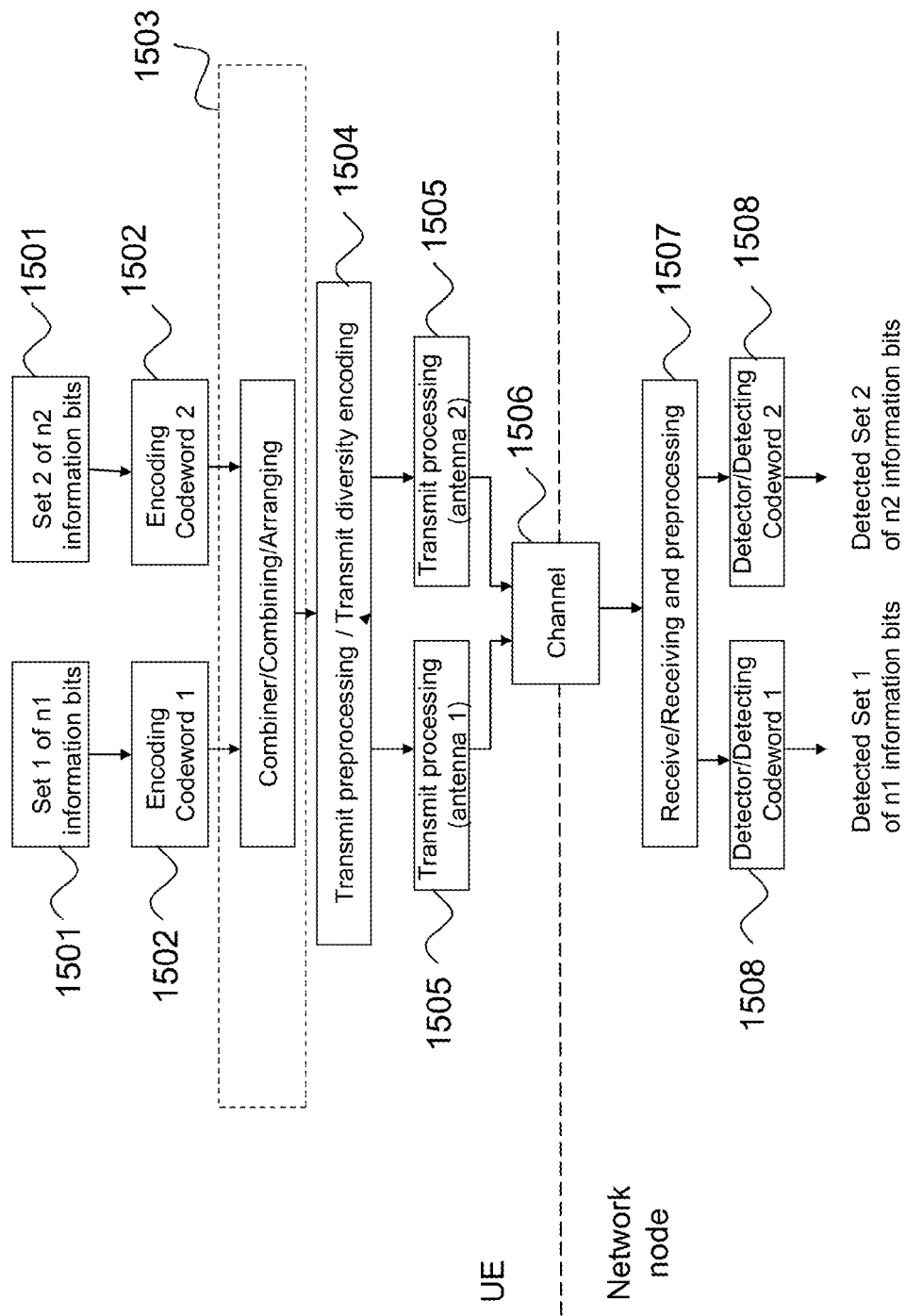
FIG. 15 is a flowchart showing embodiments of methods in a user equipment and network node.

In more detail, FIG. 15 depicts a flowchart of embodiments of a method in a user equipment 121 and a method in a network node 110 comprising actions pertaining to the arrangement and transmission of a PUCCH from the user equipment 121 and to the reception of the PUCCH transmission in the network node 110 with separate processing of two dual RM encoded codewords when transmit diversity is used.

The flowchart in FIG. 15 describes the method in a user equipment 121 for arranging a Physical Uplink Control Channel, PUCCH, transmission to a network node 110 in a telecommunications system 100 (Actions 1501-1506). The flowchart in FIG. 15 also describes the method in a network node 110 for receiving a Physical Uplink Control Channel, PUCCH, transmission from a user equipment 121 in the telecommunications system 100 (Actions 1507-1508). The PUCCH transmission comprises control information for use in downlink carrier transmissions. Furthermore, the control information is Reed-Müller, RM, encoded using at least two RM codewords and transmitted using Alamouti encoded transmit diversity over at least two antenna ports.

Furthermore, the flowchart in FIG. 15 comprises the following actions, and may be implemented for any of the above and below mentioned embodiments or in any combination with those. The actions may be performed in any suitable order.

Action 1501

Figure 8:
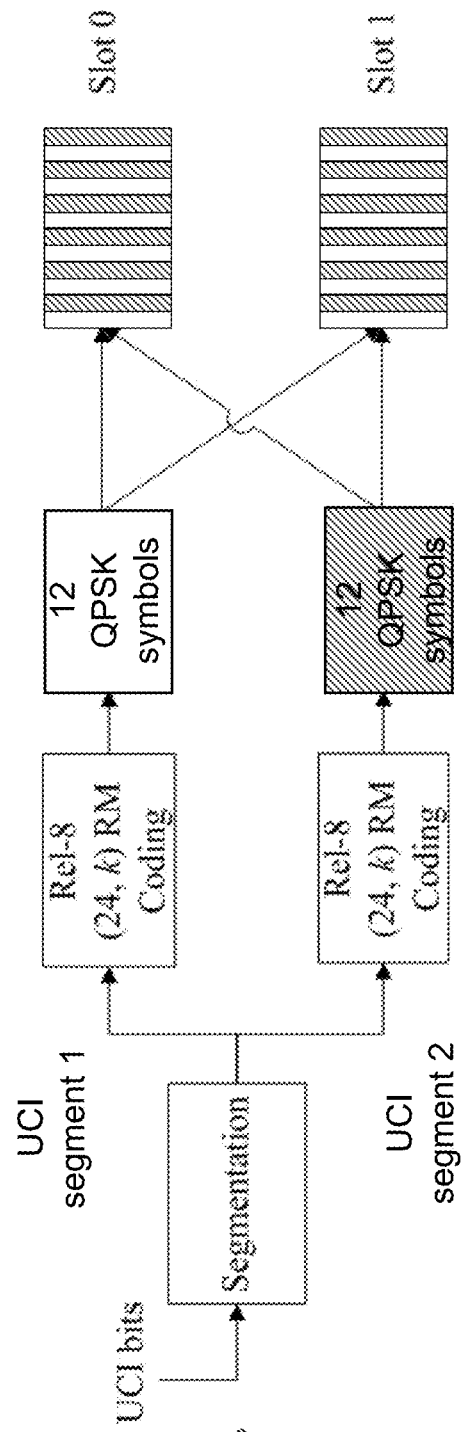
FIG. 8 is a diagrammatic view showing PUCCH Format 3 encoding and multiplexing details: Encoding and multiplexing for 12-21 UCI bits.

The user equipment 121 may use the PUCCH Format 3 to enable the possibility to transmit more than four bits of HARQ-ACK/NACK for its DL carrier PDSCH transmissions. Also, the user equipment 121 may, when the number of HARQ-ACK/NACK bits exceeds 11, split the more than 11 bits into two parts. That is, a first set of n1 information bits and a second set of n2 information bits. Thus, the control information may comprise a first bit sequence and at least a second bit sequence. This is also shown in the segmentation of the uplink control information (UCI) bits in FIG. 8.

Action 1502

The user equipment 121 may use two Reed-Müller (RM) encoders, one for each part or bit sequence respectively. This is known as dual RM coding. Up to 20 ACK/NACK bits, plus one SR bit, may therefore be supported by PUCCH Format 3.

Each of the two RM encoders may output a 24 bit sequence. These 24-bit sequences may be converted into 12 QPSK symbols per slot. Thus, the control information may comprise a first symbol sequence and at least a second symbol sequence. This is also shown in the coding of the segmented uplink control information (UCI) bits in FIG. 8.

Action 1503

In this action, the user equipment 121 may combine and interleave the two sets, or symbols sequences, of 12 QPSK symbols over the subcarriers so that the first RM encoder maps its 12 symbols onto odd subcarriers and the second RM encoder maps its 12 symbols onto even subcarriers. Here, 6 odd and 6 even sub-carriers are assumed per slot. Also, it should be noted that in the "map to . . . " operation, a cell, slot and symbol specific cyclic shift of the symbols in time domain is included so as to provide inter-cell interference randomization.

In addition to the combining and interleaving, either the bits in the output bit sequences from the RM encoders in Action 1502 or the symbols in the QPSK modulated symbols sequence in Action 1502, are also rearranged by the user equipment 121 so that two modulated symbols that later are Alamouti encoded together originates from, or comes from, the same one of the dual RM codeword. That is, the same codeword of the two codewords of the RM encoding or the same RM encoder. In this way, each codeword may be processed independently in the network node 110, that is, the part or bit sequence that has been RM encoded using one RM codeword and the part or bit sequence that has been RM encoded using another RM codeword may be processed independent of each other in the network node 110.

Thus, the user equipment 121 arranges the first bit or symbol sequence and at least second bit or symbol sequence, such that at least two bits or symbols from the first bit or symbol sequence and the at least second bit or symbol sequences that subsequently are Alamouti encoded together originate from the same RM codeword of the at least two RM codewords. This is performed in order to enable the control information encoded using one RM codeword to be processed independently from the control information encoded using another RM codeword at the network node 110.

The arranging may be performed by the user equipment 121 by sorting an order of bits in the first bit sequence and the at least second bit sequence. Alternatively, the user equipment 121 may perform the arranging by sorting an order of symbols of the first symbol sequence and the at least second symbol sequence. In this case, the first symbol sequence and the at least second symbol sequence comprises scrambled and Quadrature Phase Shift Keying, QPSK, modulated bits from the first bit sequence and the at least second bit sequence.

Action 1504

In this action, the user equipment 121 may then apply the Alamouti encoding to the 12 QPSK symbols per slot generated, in order to achieve the transmit diversity over the at least two antenna ports of the user equipment 121. It should be noted that the arranging of the bit or symbols sequences in Action 1503, may also be performed as part of the transmit diversity encoding performed in this action.

The QPSK modulated symbol $s_i$ and $s_{i+1}$ are Alamouti encoded together according to the Alamouti code to form a Space Time Block Code (STBC):

$$\begin{pmatrix} s_i & s_{i+1} \\ s_{i+1}^* & -s_i^* \end{pmatrix}$$

As previously mentioned, in practice, the 12 sub-carriers are divided into two groups of 6 sub-carriers, and within each group the Alamouti scheme is applied on the first sub-carrier and the sixth sub-carrier, on the second sub-carrier and the fifth sub-carrier and on the third sub-carrier and the fourth sub-carrier. Here again, performance degradation due to channel frequency selectivity may arise as the frequency distance between symbols jointly encoded by the SFBC increases but this degradation will be limited thanks to the small bandwidth of PUCCH.

Also, the user equipment 121 may spread the 12 QPSK symbols per slot across the five DFTS-OFDM symbols by using one out of five orthogonal cover codes as part of the transmit pre-processing.

Action 1505

Figure 10:
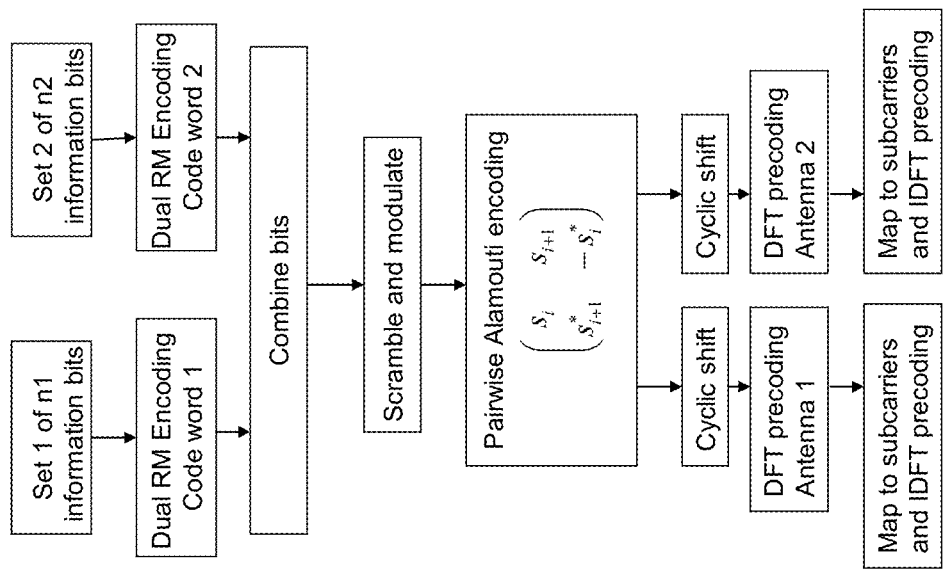
FIG. 10 is a flowchart showing basic actions in applying an Alamouti scheme within a SC-FDMA symbol on the six pairs of modulation symbols before the DFT operation.
Figure 11:
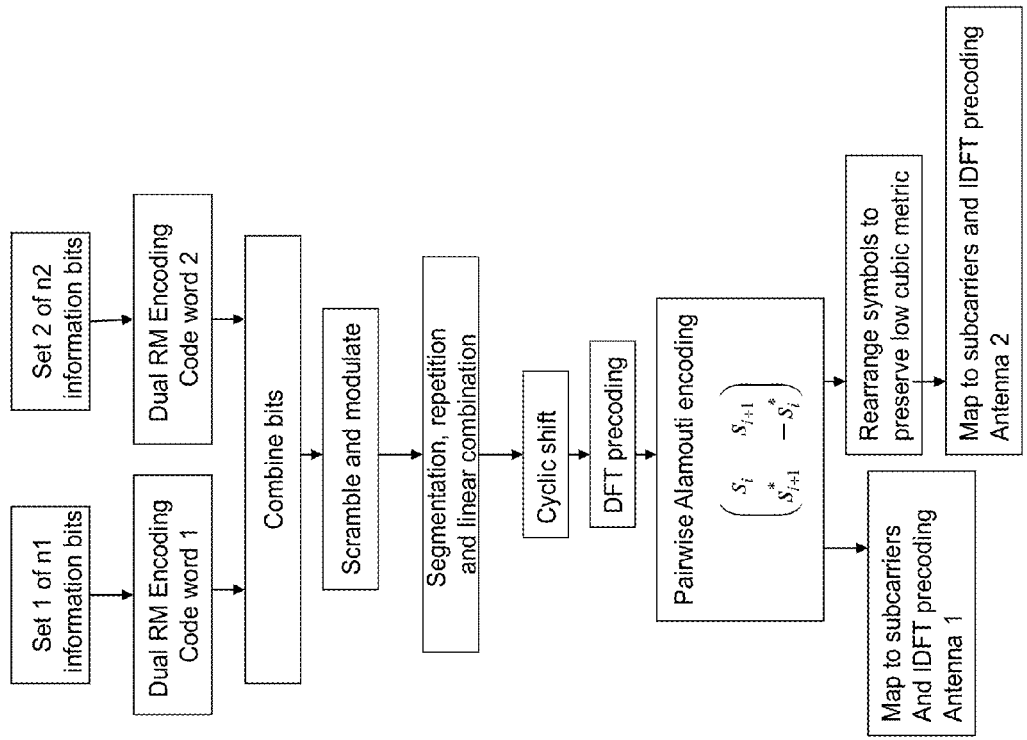
FIG. 11 is a flowchart showing basic acts or steps in modifying an Alamouti scheme in order to guarantee the same cubic metric as STBC on both transmit antennas.

The user equipment 121 may then process the Alamouti encoded sequences for transmission over the at least two antenna ports of the user equipment 121. This may comprise one or more of the actions shown in FIGS. 10-11, such as, for example, scrambling and modulating, segmentation, repetition, linear combination, cyclic shift, DFT precoding, mapping to subcarriers and performing IDFT pre-coding. This may also be performed as part of the transmit diversity encoding of the previous action 1504.

Action 1506

The user equipment 121 may transmit the PUCCH Format 3 transmission over uplink channel (UL) from the at least two antenna ports of the user equipment 121 to the network node 110.

Action 1507

The network node 110 may receive the PUCCH Format 3 transmission over uplink channel (UL) from the at least two antenna ports of the user equipment 121.

Action 1508

Then, the network node 110 may use two Reed-Müller (RM) decoders, one for the part or bit sequence that has been RM encoded using one RM codeword and one for the part or bit sequence that has been RM encoded using another RM codeword respectively. This is enabled by having the bit sequences or the QPSK modulated symbols sequences rearranged in the user equipment 121 so that two modulated symbols that are Alamouti encoded together comes from the same dual RM codeword, that is, the same codeword of the two codewords of the RM encoding.

Thus, the network node 110 may process the control information such that the control information encoded using one RM codeword is processed independently from control information encoded using another RM codeword.

In accordance with the described embodiments herein, the user equipment 121, the network node 110 and apparatuses enclosed therein, such as, encoders and modulators, along with methods in the user equipment 121 and the network node 110 with transmit diversity are provided which ensure that each codeword may be processed independently in the receiver, i.e. in the network node 110, for an Alamouti-encoded PUCCH transmit diversity scheme with dual RM encoding; this with a payload n1 and n2 for the two RM encoders, respectively. With this separate processing, the number of hypotheses in the maximum likelihood detection in the network node 110 may be reduced to $2^{n_1}+2^{n_2}$ compared to $2^{n_1+n_2}$, which is a significant reduction.

Figure 13:
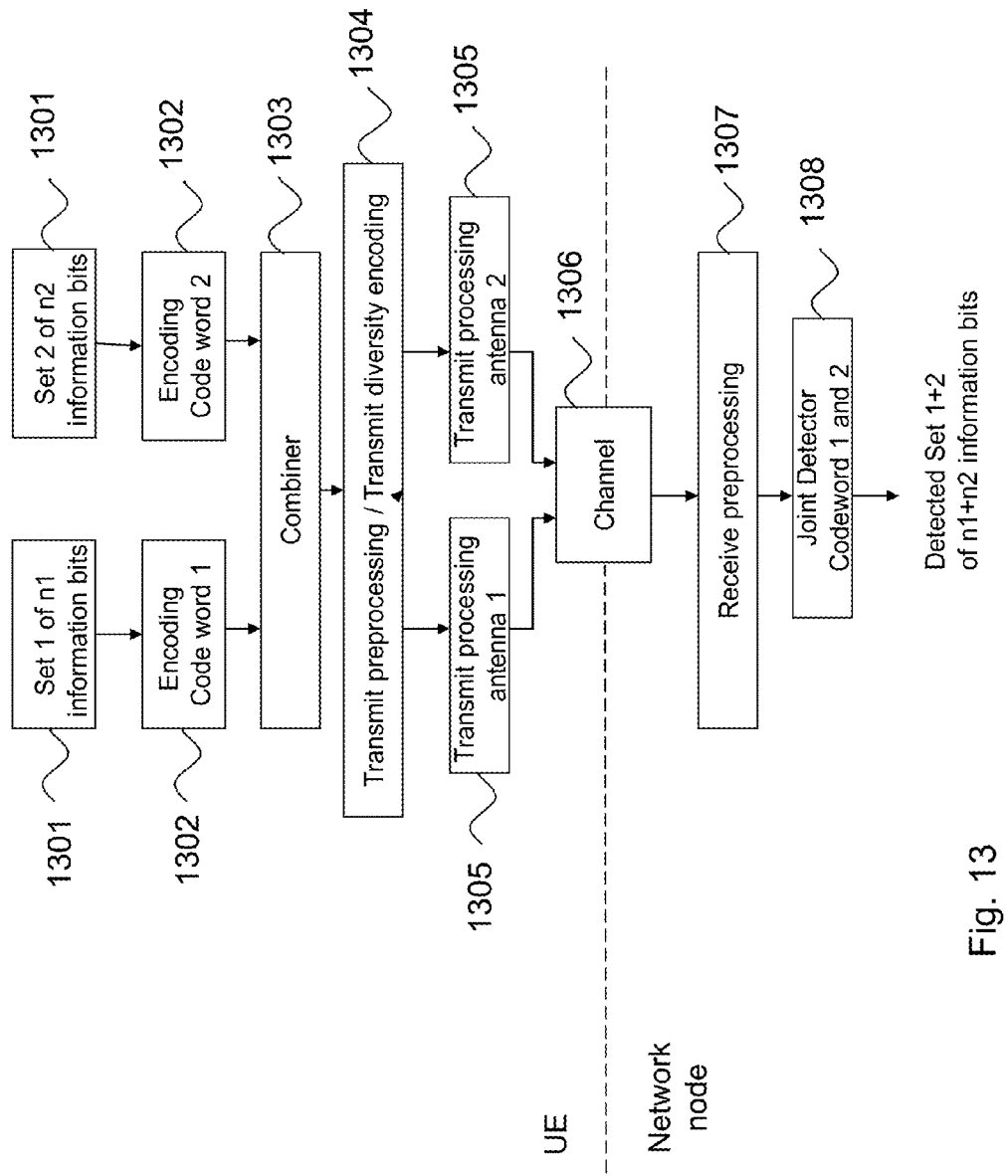
FIG. 13 is a flowchart showing basic acts or steps of transmission and reception with joint detection of two dual RM encoded codewords when transmit diversity is used.

The overview in FIG. 15 shows when this separate processing of the two codewords is possible, in comparison to, for example, the overview of transmission and reception where joint processing must be used, as shown in the prior art example of FIG. 13. For the embodiments described herein, it may be assumed that the dual RM encoded transmission of control information is using Alamouti encoding and is transmitted over 2 antenna ports in the user equipment 121. The number of input information bits is n1 and n2 for the two dual RM encoders, respectively. With separate processing of the two codewords in the receiver, i.e. in the network node 110, which is made possible with the technology disclosed herein, and as exemplified in the embodiments herein, the number of hypotheses in the maximum likelihood detection is reduced to $2^{n1}+2^{n2}$ compared to $2^{n1+n2}$, which is a significant reduction.

Figure 9:
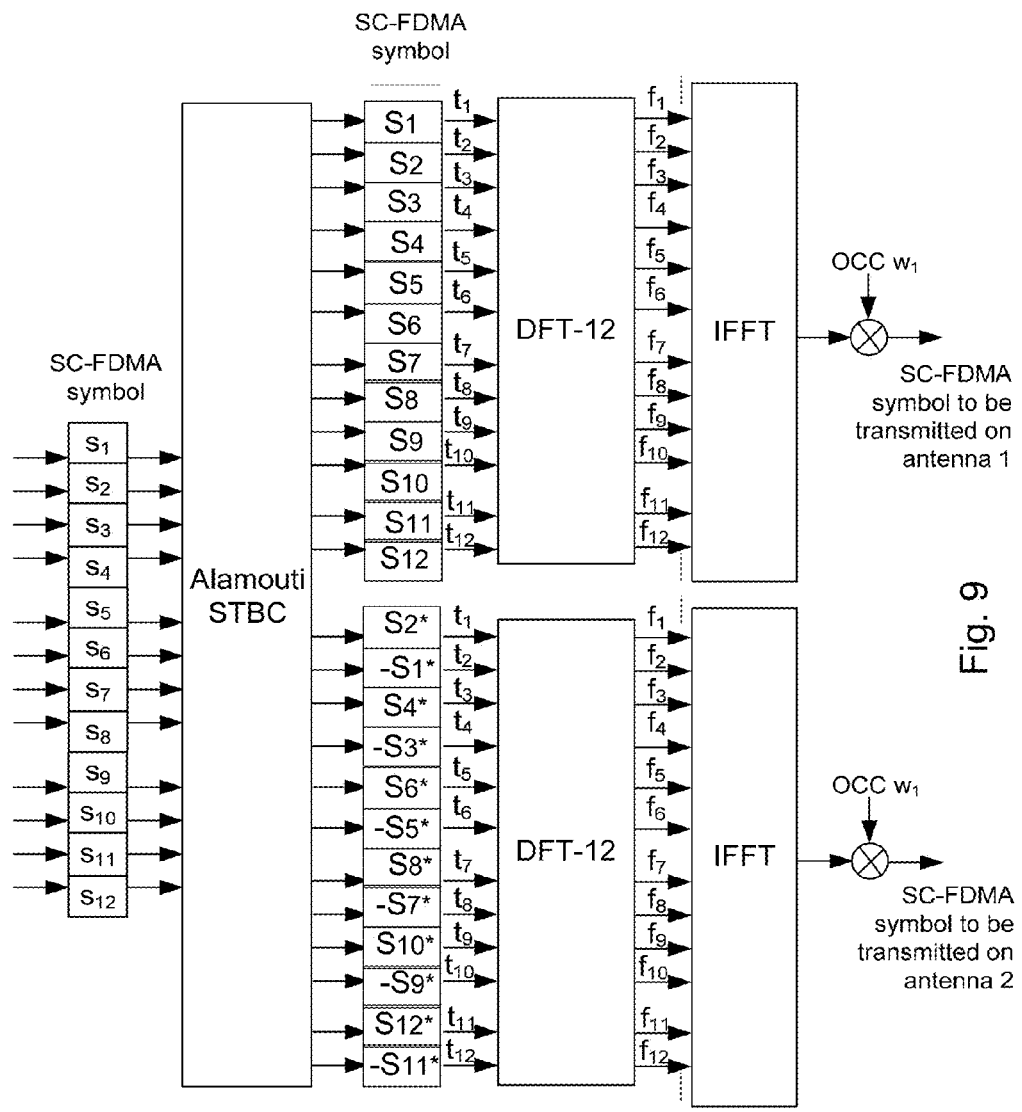
FIG. 9 is a diagrammatic view showing Alamouti encoding before DFT precoding.

In some embodiments, the Alamouti encoding may be applied before DFT, such as, for example, shown in the prior art example in FIG. 9.

In this case, the arranging described in Action 1503 may be performed by the output bit sequence $b_0, b_1, b_2, \ldots, b_{B-1}$, where $B=4 \cdot N_{sc}^{RB}$, to be Alamouti encoded, being obtained by the alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$, that is, the output bit sequences from the RM encoders in Action 1502, as follows:

```
set i, j = 0
while i < 4 · N_sc^RB
    b_i     = b̃_j,
    b_{i+1} = b̃_{j+1},
    b_{i+2} = b̃_{j+2},
    b_{i+3} = b̃_{j+3},
    b_{i+4} = b̃̃_j,
    b_{i+5} = b̃̃_{j+1},
    b_{i+6} = b̃̃_{j+2},
    b_{i+7} = b̃̃_{j+3},
    i = i + 8,
    j = j + 4,
end while
```

Here, $\tilde{b}_0, \tilde{b}_1, \tilde{b}_2, \ldots, \tilde{b}_{23}$ is the first bit sequence, $\tilde{\tilde{b}}_0, \tilde{\tilde{b}}_1, \tilde{\tilde{b}}_2, \ldots, \tilde{\tilde{b}}_{23}$ is the at least second bit sequence, and $N_{sc}^{RB}=12$ is a number of subcarriers per resource block in the PUCCH transmission. Furthermore, $b_0, b_1, b_2, \ldots, b_{B-1}$ an output bit sequence that is to be scrambled, Quadrature Phase Shift Keying, QPSK, modulated and Alamouti encoded, before being pre-coded using a discrete Fourier transformation, DFT, and being transmitted in the PUCCH transmission to the network node 110.

This has the advantage that symbols that are Alamouti encoded together before the DFT precoding, originate from the same codeword in the dual RM encoder. In this way each codeword may be processed independently in the receiver, i.e. in the network node 110, which leads to reduced complexity in the network node 110.

The embodiments in which the Alamouti encoding is applied before DFT may be referred to as Space Time Block Coding (STBC) processing.

In some embodiments, the Alamouti encoding may be applied after DFT precoding. This means that is, the user equipment 121 may apply an Alamouti encoding to the first symbol sequence and the at least second symbol sequence after the first symbol sequence and the at least second symbol sequence have been pre-coded using the discrete Fourier transformation, DFT.

In this case, the arranging or re-arranging described in Action 1503 may be performed by first, alternate concatenation of the sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$, that is, the output bit sequences from the RM encoders in Action 1502. Then, the concatenated bit sequence may be scrambled and QPSK modulated to form the QPSK modulated symbols sequence $$s_0, s_1, s_2, \ldots, s_{2N_{sc}^{RB}-1}.$$

Here, $$s_0 = \left(s_0, s_1, s_2, \ldots, s_{N_{sc}^{RB}-1}\right) \text{ and}$$

$$s_1 = \left(s_{N_{sc}^{RB}}, s_{N_{sc}^{RB}+1}, s_{N_{sc}^{RB}+2}, \ldots, s_{2N_{sc}^{RB}-1}\right)$$

correspond to sequences of output coded bits that are to be transmitted via the first slot and second slot, respectively. In each sequence of output coded bits, every other symbol corresponds to one codeword of the codewords of the first and second RM encoder.

Thereafter, the QPSK modulated symbols sequences $$s_0 = \left(s_0, s_1, s_2, \ldots, s_{N_{sc}^{RB}-1}\right) \text{ and}$$

$$s_1 = \left(s_{N_{sc}^{RB}}, s_{N_{sc}^{RB}+1}, s_{N_{sc}^{RB}+2}, \ldots, s_{2N_{sc}^{RB}-1}\right)$$

may be segmented before being pre-coded using the discrete Fourier transformation, DFT. In this case, the user equipment 121 may here sort the order of the symbols of the first symbol sequence $s_0$ and the at least second symbol sequence $s_1$ accordingly such that at least two symbols from the first symbol sequence $s_0$ and the at least second symbol sequences $s_1$ that subsequently are Alamouti encoded together, originate from the same RM codeword of the at least two RM codewords.

Figure 12:
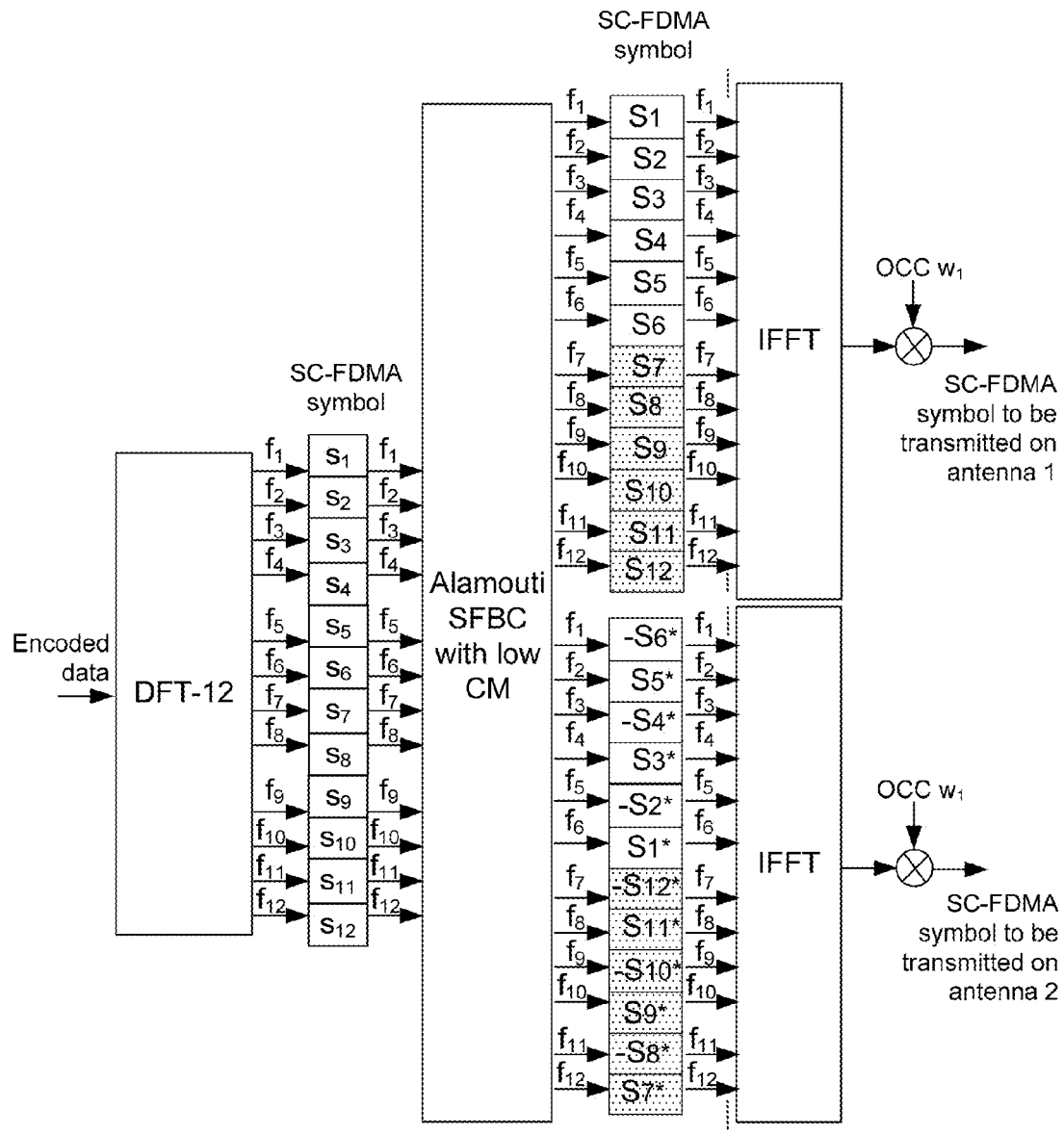
FIG. 12 is a diagrammatic view depicting Alamouti encoding after DFT precoding.

Each of these segmented symbols sequences $s_1$ and $s_0$ may then be repeated and linearly combined with a linear phase shift, and then DFT precoded. The output of the DFT outputs may then be Alamouti encoded, as is shown, for example, in the prior art example in FIG. 12.

In some embodiments, the user equipment 121 may segment the QPSK modulated symbols sequences $s_c$ to, for example, L=4 parts. Here, c=0,1, where c denotes the codeword index, and segment l=0, ..., L−1 comprises $M=N_{sc}^{RB}/L=3$ consecutive symbols, where denotes the segment index. Each segment corresponding to a codeword is then repeated L=4 times to form L=4 segmented sequences of $N_{sc}^{RB}=12$ symbols. Each such segmented symbol sequence is herein denoted by $\tilde{s}_l^c$. This may give, for example:

$$\tilde{s}_0^0 = (\tilde{s}_0^0(0), \ldots, \tilde{s}_0^0(N_{sc}^{RB}-1)) = (s_0, s_2, s_4, s_0, s_2, s_4, s_0, s_2, s_4, s_0, s_2, s_4)$$

$$\tilde{s}_1^0 = (\tilde{s}_1^0(0), \ldots, \tilde{s}_1^0(N_{sc}^{RB}-1)) = (s_6, s_8, s_{10}, s_6, s_8, s_{10}, s_6, s_8, s_{10}, s_6, s_8, s_{10})$$

$$\tilde{s}_2^0 = (\tilde{s}_2^0(0), \ldots, \tilde{s}_2^0(N_{sc}^{RB}-1)) = (s_{12}, s_{14}, s_{16}, s_{12}, s_{14}, s_{16}, s_{12}, s_{14}, s_{16}, s_{12}, s_{14}, s_{16})$$

$$\tilde{s}_3^0 = (\tilde{s}_3^0(0), \ldots, \tilde{s}_3^0(N_{sc}^{RB}-1)) = (s_{18}, s_{20}, s_{22}, s_{18}, s_{20}, s_{22}, s_{18}, s_{20}, s_{22}, s_{18}, s_{20}, s_{22})$$

and $$\tilde{s}_0^1 = (\tilde{s}_0^1(0), \ldots, \tilde{s}_0^1(N_{sc}^{RB}-1)) = (s_1, s_3, s_5, s_1, s_3, s_5, s_1, s_3, s_5, s_1, s_3, s_5)$$

$$\tilde{s}_1^1 = (\tilde{s}_1^1(0), \ldots, \tilde{s}_1^1(N_{sc}^{RB}-1)) = (s_7, s_9, s_{11}, s_7, s_9, s_{11}, s_7, s_9, s_{11}, s_7, s_9, s_{11})$$

$$\tilde{s}_2^1 = (\tilde{s}_2^1(0), \ldots, \tilde{s}_2^1(N_{sc}^{RB}-1)) = (s_{13}, s_{15}, s_{17}, s_{18}, s_{15}, s_{17}, s_{18}, s_{15}, s_{17}, s_{13}, s_{15}, s_{17})$$

$$\tilde{s}_3^1 = (\tilde{s}_3^1(0), \ldots, \tilde{s}_3^1(N_{sc}^{RB}-1)) = (s_{19}, s_{21}, s_{23}, s_{19}, s_{21}, s_{23}, s_{19}, s_{21}, s_{23}, s_{19}, s_{21}, s_{23})$$

Accordingly, these segmented symbol sequences $\tilde{s}_l^c$ may be linearly combined with a linear phase shift to form the input for the DFT precoding for each slot.

If $N_s=2$ denotes the number of slots in a sub-frame, and $n_s=N_s-1$ denotes the slot index, then the input to the DFT precoding for each slot may, for example, be given by:

$$\tilde{\tilde{s}}_{n_s}(n) = \frac{1}{\sqrt{L}} \begin{bmatrix} \sum_{l=0}^{\frac{L}{N_s}-1} \tilde{s}_{n_s\frac{L}{N_s}+l}^{c=0}(n) \exp\left(j2\pi \frac{nl}{N_{sc}^{RB}}\right) + \\ \sum_{l=0}^{\frac{L}{N_s}-1} \tilde{s}_{n_s\frac{L}{N_s}+l}^{1}(n) \exp\left(j2\pi \frac{n \cdot (L/N_s+l)}{N_{sc}^{RB}}\right) \end{bmatrix}$$

where $n=0, \ldots, N_{sc}^{RB}-1$ is the subcarrier index, $N_{sc}^{RB}=12$ is the number of subcarriers per resource block in the PUCCH transmission, L=4 is the used number of segments, $l=0, \ldots, L-1$ is the segment index, c=0,1 is the RM codeword index, $$\tilde{s}_{n_s\frac{L}{N_s}+l}^{c}(n)$$

is the repeated symbol $n=0, \ldots, N_{sc}^{RB}-1$ corresponding to segment $l=0, \ldots, L-1$, slot $n_s=0, \ldots, N_s-1$ and RM codeword c=0,1.

More explicitly for the current exemplary parameters of $N_s=2$ number of slots in a sub-frame and L=4 parts, the time-domain symbols for the first slot may be given by $$\tilde{\tilde{s}}_0(n) = \frac{1}{2} \begin{bmatrix} \tilde{s}_0^0(n) + \tilde{s}_1^0(n)\exp\left(j2\pi\frac{n}{N_{sc}^{RB}}\right) + \\ \tilde{s}_0^1(n)\exp\left(j2\pi\frac{2n}{N_{sc}^{RB}}\right) + \tilde{s}_1^1(n)\exp\left(j2\pi\frac{3n}{N_{sc}^{RB}}\right) \end{bmatrix}$$

and the time-domain symbols for the second slot may be given by $$\tilde{\tilde{s}}_1(n) = \frac{1}{2} \begin{bmatrix} \tilde{s}_2^0(n) + \tilde{s}_3^0(n)\exp\left(j2\pi\frac{n}{N_{sc}^{RB}}\right) + \\ \tilde{s}_2^1(n)\exp\left(j2\pi\frac{2n}{N_{sc}^{RB}}\right) + \tilde{s}_3^1(n)\exp\left(j2\pi\frac{3n}{N_{sc}^{RB}}\right) \end{bmatrix}.$$

Thus, for example, if these two time-domain linearly combined and segmented sequences $\tilde{\tilde{s}}_0(n)$ and $\tilde{\tilde{s}}_1(n)$ are sent to the DFT, the resulting outputs from the DFT may be given by $$S_{n_s=0} = (S_0, S_1, S_2, \ldots, S_{N_{sc}^{RB}-1}) \text{ and }$$

$$S_{n_s=1} = (S_{N_{sc}^{RB}}, S_{N_{sc}^{RB}+1}, S_{N_{sc}^{RB}+2}, \ldots, S_{2N_{sc}^{RB}-1}).$$

These DFT outputs then corresponds to the first slot and the second slot, respectively. These DFT outputs also have the property that every two consecutive frequency-domain symbols belong to one and the same RM codeword.

In other words, $S_{4k}$ and $S_{4k+1}$ belong to the first codeword, and $S_{4k+2}$ and $S_{4k+3}$ belong to the second codeword. Here, $k=0 \ldots N_{sc}^{RB}/N_s$.

When the Alamouti encoding is applied on these DFT pre-coded symbols $S_{n_s}$ for $n_s=0, \ldots, N_s-1$, it may clearly be seen that the symbols that are Alamouti encoded together originate from the same codeword in the dual RM encoder. In this way, the Alamouti decoding may subsequently be performed for each codeword independently in the receiver, i.e. in the network node 110. This allows for separation of the receiver or network node 110 processing of the two codewords. This will consequently reduce the complexity as previously described.

Figure 6:
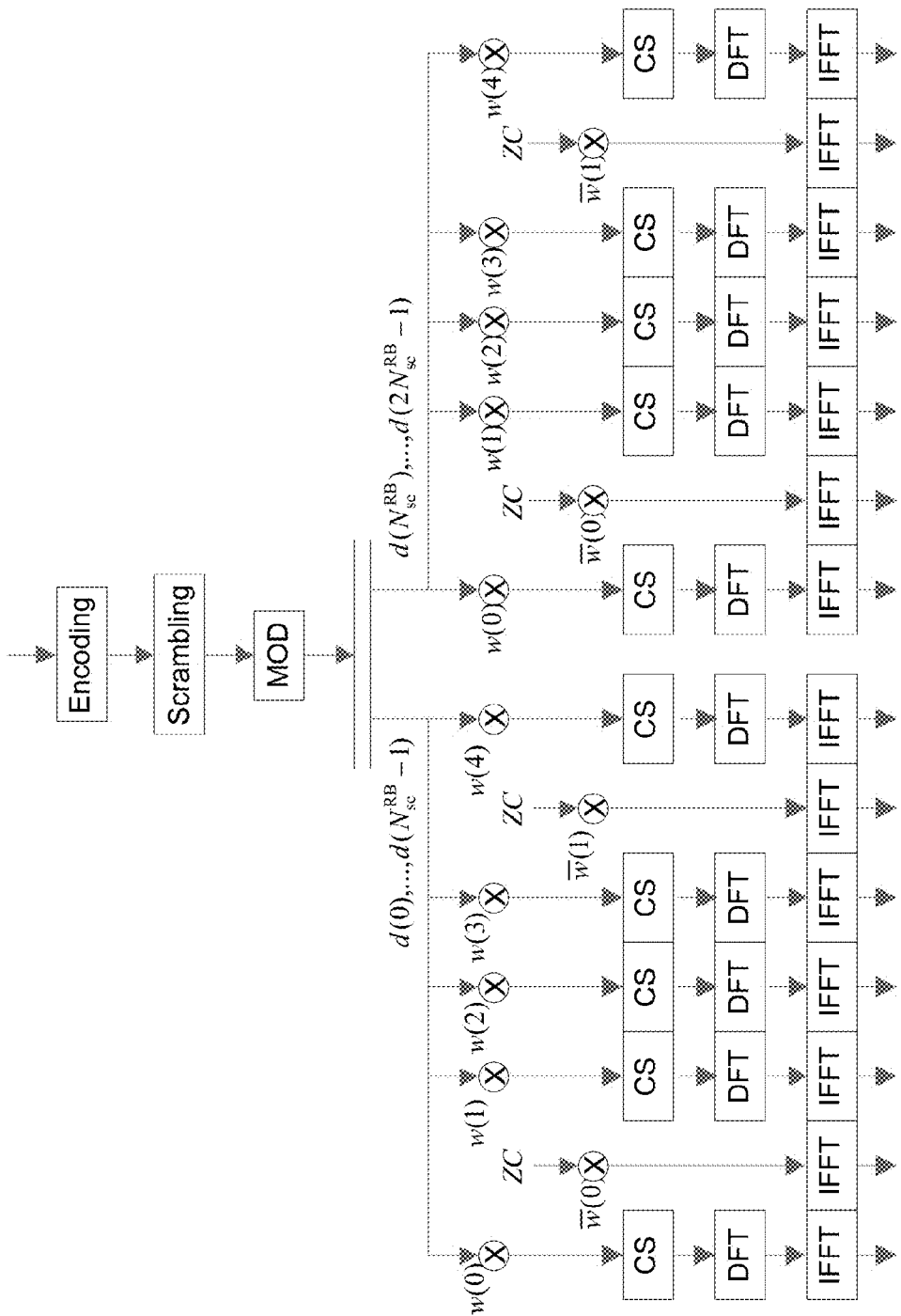
FIG. 6 is a diagrammatic view showing DFT-S-OFDM based PUCCH Format 3 for UE supporting more than 4 HARQ bits in normal CP sub-frames.
Figure 7:
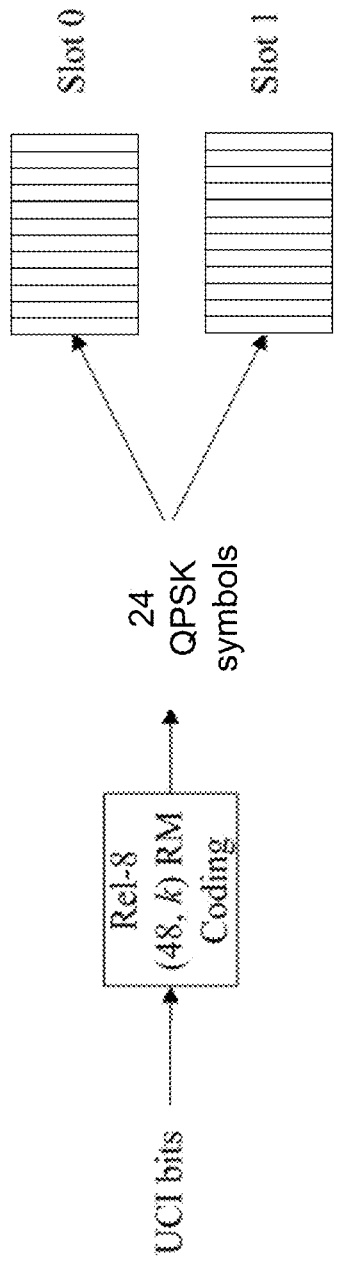
FIG. 7 is a diagrammatic view showing PUCCH Format 3 encoding and multiplexing details: Encoding and multiplex for up to 11 UCI bits.

As, for example, illustrated in the prior art example in FIG. 6, there are additional operations on the time-domain sequences in each slot. For transmission in l-th data SC-FDMA symbol, the time-domain sequence $$\{\tilde{\tilde{s}}_{n_s}(n)\}_{n=0}^{N_{sc}^{RB}-1}$$

is first multiplied by a scalar $w_l$ and the resulting sequence is then cyclically shifted by $\Delta_l$. However, these two operations do not affect the design objective stated in the above. That is, every two consecutive frequency-domain symbols will still belong to the same codeword. This is because the cyclic shift in the time-domain is equivalent to multiplying a frequency-domain sequence with a phase rotation sequence.

Therefore, the positioning and multiplexing of the coded symbols in pairs as described above is not affected. Thus, the embodiment described above allows separate processing of the two codewords.

The embodiments herein in which the Alamouti encoding is applied after DFT may be referred to as a Space Frequency Block Coding (SFBC) or a Modified Space Frequency Block Coding (MSFBC) processing.

In some embodiments, the SFCB or MSFBC processing described above is to be compatible with the LTE specification for the PUCCH Format 3 dual codeword encoding and multiplexing procedure as described in 3GPP TS 36.212 v10.3.0, which is hereby incorporated herein by reference. Under such multiplexing rules, the coded control information bits from the different codewords from each of the RM encoders are mixed pair by pair. According to the embodiments disclosed herein, Section 5.4.2A of 3GPP TS 36.211 v10.3.0, which is hereby incorporated herein by reference, may be modified as described below as Appendix I: PUCCH Format 3.

APPENDIX I

PUCCH Format 3

The block of bits b(0), ..., b($M_{bit}$−1) shall be scrambled with a UE-specific scrambling sequence, resulting in a block of scrambled bits $\tilde{b}(0), \ldots, \tilde{b}(M_{bit}-1)$ according to $$\tilde{b}(i)=(b(i)+c(i)) \bmod 2$$

where the scrambling sequence c(i) is given by Section 7.2. The scrambling sequence generator shall be initialised with $c_{init}=(\lfloor n_s/2 \rfloor+1)\cdot(2N_{ID}^{cell}+1)\cdot 2^{16}+n_{RNTI}$ at the start of each sub-frame where $n_{RNTI}$ is the C-RNTI.

The block of scrambled bits $\tilde{b}(0), \ldots, \tilde{b}(M_{bit}-1)$ shall be QPSK modulated as described in Section 7.1, resulting in a block of complex-valued modulation symbols d(0), ..., d($M_{symb}$−1) where $M_{symb}=M_{bit}/2=2N_{sc}^{RB}$.

If SORTD is configured for PUCCH Format 3, the complex-value symbols for each antenna port $\tilde{p}$ is given by $$d^{(\tilde{p})}(i)=d(i) \text{ for } i=0,1,\ldots,2N_{sc}^{RB}-1.$$

If FMSFBC for P=2 is configured for PUCCH Format 3, the complex-value symbols for each antenna port $\tilde{p}$ is given by $$d^{(0)}(i) = \begin{cases} \frac{1}{2}\sum_{k=0}^{3} d\left(2\cdot\binom{(i \bmod N_{sc}^{RB}/4)+}{(k \bmod 2)\cdot N_{sc}^{RB}/4}\right)+ \\ \lfloor k/2 \rfloor \bigg) \cdot e^{j\frac{2\pi ki}{N_{sc}^{RB}}} & i < N_{sc}^{RB} \\ \frac{1}{2}\sum_{k=0}^{3} d\left(2\cdot\binom{(i \bmod N_{sc}^{RB}/4)+}{(k \bmod 2)\cdot N_{sc}^{RB}/4}\right)+ \\ \lfloor k/2 \rfloor + N_{sc}^{RB}\bigg) \cdot e^{j\frac{2\pi ki}{N_{sc}^{RB}}} & \text{otherwise} \end{cases}$$

$$d^{(1)}(i) = \begin{cases} d^{(0)*}\left(i+\frac{N_{sc}^{RB}}{2}\bmod N_{sc}^{RB}\right)\cdot & i < N_{sc}^{RB} \\ e^{j\frac{2\pi i}{N_{sc}^{RB}}\left(\frac{N_{sc}^{RB}}{2}-1\right)} \\ d^{(0)*}\left(\left(i+\frac{N_{sc}^{RB}}{2}\bmod N_{sc}^{RB}\right)+N_{sc}^{RB}\right)\cdot & \text{otherwise} \\ e^{j\frac{2\pi i}{N_{sc}^{RB}}\left(\frac{N_{sc}^{RB}}{2}-1\right)} \end{cases}$$

$$i=0,1,\ldots,2N_{sc}^{RB}-1$$

The complex-valued symbols $d^{(\tilde{p})}(0), \ldots, d^{(\tilde{p})}(M_{symb}-1)$ shall be block-wise spread with the orthogonal sequences $$w_{n_{oc,0}^{(\tilde{p})}}(i) \text{ and } w_{n_{oc,1}^{(\tilde{p})}}(i)$$

resulting in $N_{SF,0}^{PUCCH}+N_{SF,1}^{PUCCH}$ sets of $N_{SC}^{RB}$ values each according to $$y_n^{(\tilde{p})}(i) = \begin{cases} w_{n_{oc,0}^{(\tilde{p})}}(\bar{n}) \cdot e^{j\pi\lfloor n_{cs}^{cell}(n_s,l)/64 \rfloor/2} \cdot d^{(\tilde{p})}(i) & n < N_{SF,0}^{PUCCH} \\ w_{n_{oc,1}^{(\tilde{p})}}(\bar{n}) \cdot e^{j\pi\lfloor n_{cs}^{cell}(n_s,l)/64 \rfloor/2} \cdot d^{(\tilde{p})}(N_{sc}^{RB}+i) & \text{otherwise} \end{cases}$$

$$\bar{n} = n \bmod N_{SF,0}^{PUCCH}$$

$$n = 0, \ldots, N_{SF,0}^{PUCCH}+N_{SF,1}^{PUCCH}-1$$

$$i = 0, 1, \ldots, N_{sc}^{RB}-1$$

where $N_{SF,0}^{PUCCH}=N_{SF,1}^{PUCCH}=5$ for both slots in a sub-frame using normal PUCCH Format 3 and $N_{SF,0}^{PUCCH}=5$, $N_{SF,1}^{PUCCH}=4$ holds for the first and second slot, respectively, in a sub-frame using shortened PUCCH Format 3. The orthogonal sequences $$w_{n_{oc,0}^{(\tilde{p})}}(i) \text{ and } w_{n_{oc,1}^{(\tilde{p})}}(i)$$

are given by Table 5.4.2A-1. If SORTD is configured for PUCCH Format 3, resources used for transmission of PUCCH Formats 3 are identified by a resource index $n_{PUCCH}^{(3,\tilde{p})}$ from which the quantities $n_{oc,0}^{(\tilde{p})}$ and $n_{oc,1}^{(\tilde{p})}$ are derived according to $$n_{oc,0}^{(\tilde{p})} = n_{PUCCH}^{(3,\tilde{p})} \bmod N_{SF,1}^{PUCCH}$$

$$n_{oc,1}^{(\tilde{p})} = \begin{cases} (3n_{oc,0}^{(\tilde{p})})\bmod N_{SF,1}^{PUCCH} & \text{if } N_{SF,1}^{PUCCH}=5 \\ n_{oc,0}^{(\tilde{p})}\bmod N_{SF,1}^{PUCCH} & \text{otherwise} \end{cases}$$

If FMSFBC is configured for PUCCH Format 3, $n_{PUCCH}^{(3,1)}=n_{PUCCH}^{(3,0)}$.

Each set of complex-valued symbols shall be cyclically shifted according to $$\tilde{y}_n^{(\tilde{p})} = y_n^{(\tilde{p})}((i+n_{cs}^{cell}(n_s,l))\bmod N_{sc}^{RB})$$

where $n_{cs}^{cell}(n_s,l)$ is given by Section 5.4, $n_s$ is the slot number within a radio frame and l is the SC-FDMA symbol number within a slot.

The shifted sets of complex-valued symbols shall be transform precoded according to $$z^{(\tilde{p})}(n\cdot N_{sc}^{RB}+k) = \frac{1}{\sqrt{P}}\frac{1}{\sqrt{N_{sc}^{RB}}}\sum_{i=0}^{N_{sc}^{RB}-1}\tilde{y}_n^{(\tilde{p})}(i)e^{-j\frac{2\pi ik}{N_{sc}^{RB}}}$$

$$k=0,\ldots,N_{sc}^{RB}-1$$

$$n=0,\ldots,N_{SF,0}^{PUCCH}+N_{SF,1}^{PUCCH}-1$$

where P is the number of antenna ports used for PUCCH transmission, resulting in a block of complex-valued symbols $z^{(\tilde{p})}(0), \ldots, z^{(\tilde{p})}((N_{SF,0}^{PUCCH}+N_{SF,1}^{PUCCH})N_{sc}^{RB}-1)$.

TABLE 5.4.2A-1

| | The orthogonal sequence $w_{n_{oc}}(i)$. | |
|---|---|---|
| Sequence index $n_{oc}$ | Orthogonal sequence $[w_{n_{oc}}(0) \ldots w_{n_{oc}}(N_{SF}^{PUCCH}-1)]$ | |
| | $N_{SF}^{PUCCH}=5$ | $N_{SF}^{PUCCH}=4$ |
| 0 | $[1\ 1\ 1\ 1\ 1]$ | $[+1\ +1\ +1\ +1]$ |
| 1 | $[1\ e^{j2\pi/5}\ e^{j4\pi/5}\ e^{j6\pi/5}\ e^{j8\pi/5}]$ | $[+1\ -1\ +1\ -1]$ |
| 2 | $[1\ e^{j4\pi/5}\ e^{j8\pi/5}\ e^{j2\pi/5}\ e^{j6\pi/5}]$ | $[+1\ +1\ -1\ -1]$ |
| 3 | $[1\ e^{j6\pi/5}\ e^{j2\pi/5}\ e^{j8\pi/5}\ e^{j4\pi/5}]$ | $[+1\ -1\ -1\ +1]$ |
| 4 | $[1\ e^{j8\pi/5}\ e^{j6\pi/5}\ e^{j4\pi/5}\ e^{j2\pi/5}]$ | — |

END OF APPENDIX I

In some embodiments, one of the two codewords in the dual RM encoder, that is, the two RM encoders described in Action 1502, comprises encoded information bits of HARQ-ACK information and the other codeword contains encoded information bits of channel state information. This means that control information encoded using one of the at least two RM codewords comprises information bits of HARQ-ACK information. This also means that control information encoded using the other of the at least two RM codewords comprises information bits of channel state information.

In some embodiments, for each codeword of data symbol, the signals from Reference Signal (RS) and data are coherently accumulated. The signals for each slot and Tx/Rx antenna are non-coherently accumulated.

Thus, the network node 110 may in Action 1508 perform a Maximum Likelihood (ML) detection for each of the at least two RM codewords, that is, for the two transmit diversity (TxD) schemes perform a ML detection, according to the algorithm described by:

$$\hat{c} = \underset{c \in C}{\mathrm{argmax}} \left( \sum_{n_{rx}=0}^{N_{RX}-1} \sum_{n_s=0}^{N_{slot}-1} \sum_{n_{tx}=0}^{N_{tx}-1} \left| \hat{h}_{n_s,n_{rx},n_{tx},RS} + \alpha \cdot \hat{h}^c_{n_s,n_{rx},n_{tx},data} \right|^2 \right)$$

where $N_{RX}$ is a number of received antennas, $N_{slot}$ is a number of slots in a sub-frame, $N_{TX}$ is a number of transmit antennas, $C$ is a set containing all valid codewords, $\hat{h}_{n_s,n_{rx},n_{tx},RS}$ represents an estimated channel on receiver antenna $n_{rx}$ for antenna port $n_{tx}$ on reference symbol, RS, belonging to slot $n_s$, $\hat{h}^c_{n_s,n_{rx},n_{tx},data}$ represents an estimated channel on receiver antenna $n_{rx}$ for antenna port $n_{tx}$ by RM codeword c on data symbols belonging to slot $n_s$, and $\alpha$ is a ratio of the number of data symbols to the number of RS symbols.

Particularly, for the SFCB or MSFBC processing described above, $$\begin{pmatrix} \tilde{h}_{0,Data} \\ \tilde{h}_{1,Data} \end{pmatrix} = \begin{pmatrix} s_A^* & s_B^* \\ -s_B & s_A \end{pmatrix} \begin{pmatrix} r_0 \\ r_1 \end{pmatrix}$$

where $s_A$ and $s_B$ are subcarrier domain value (for MSFBC) or virtual subcarrier domain (for STBC), assuming that $$\begin{pmatrix} r_0 \\ r_1 \end{pmatrix} = \begin{pmatrix} s_A & -s_B^* \\ s_B & s_A^* \end{pmatrix} \begin{pmatrix} h_{0,Data} \\ h_{1,Data} \end{pmatrix} + \begin{pmatrix} n_0 \\ n_1 \end{pmatrix}$$

where $r_0$ and $r_1$ are received signals on subcarriers 0 and 1 (for MSFBC) or virtual subcarriers 0 and 1 (for STBC), $n_0$ and $n_1$ are modelling the corresponding noise and interference on those sub-carriers, $h_{0,Data}$ and $h_{1,Data}$ represent the corresponding channel, and $\hat{h}_{0,Data}$ and $\hat{h}_{1,Data}$ denote the corresponding channel estimates on sub-carriers 0 and 1.

As previously mentioned, $\alpha$ is ratio of the number data symbols to the number of RS symbols. For instance, in LTE with normal cyclic prefix, there are 24 RS symbols and 30 data symbols for each of the two codewords in a slot. In this case, $\alpha=1.25$.

Since the ML detection operates on pairwise symbols $s_A$ and $s_B$, for separation of the detection for the two codewords, $s_A$ and $s_B$ must belong to the same codeword. This is achieved by the embodiments disclosed herein.

Although the described embodiments above may be implemented in any appropriate type of telecommunication system supporting any suitable communication standards and using any suitable components, particular embodiments of the described solutions may be implemented in an LTE network, the example telecommunications system 100 may include one or more instances of user equipments 121, e.g. wireless devices, mobile terminals, laptops, M2M-capable devices, or home base station, and one or more network nodes 110 capable of communicating with these user equipments, where examples of network nodes 110 include eNBs, home base stations, positioning node (eSMLC), MME, SON node, and Gateway. Thus, some network nodes 110 such as home base stations may in some scenarios be considered as user equipments within the context of this disclosure. This is in particular true for small network devices where the form factor may significantly affect radio performance.

The example telecommunications system 100 may further include any additional elements suitable to support communication between user equipments or between a user equipment and another communication device, such as, a landline telephone. Although the illustrated network nodes 110 may represent network nodes 110 that include any suitable combination of hardware and/or software, these network nodes 110 may, in particular embodiments, represent devices such as the example network node 110 illustrated in greater detail by FIG. 16.

To perform the method actions for receiving a Physical Uplink Control Channel, PUCCH, transmission from a user equipment 121, the network node 110 comprises the following arrangement depicted in FIG. 16. FIG. 16 is a diagrammatic view of an example network node 110 according to an example embodiment.

The network node 110 comprises a processing circuitry 1603 configured to receive the PUCCH transmission from a user equipment 121 via at least two antenna ports. It is also configured to process the control information such that control information encoded using one RM codeword is processed independently from control information encoded using another RM codeword.

In some embodiments, the processing circuitry 1603 is configured to perform a Maximum Likelihood (ML) detection for each of the at least two RM codewords according to the algorithm described by:

$$\hat{c} = \underset{c \in C}{\mathrm{argmax}} \left( \sum_{n_{rx}=0}^{N_{RX}-1} \sum_{n_s=0}^{N_{slot}-1} \sum_{n_{tx}=0}^{N_{tx}-1} \left| \hat{h}_{n_s,n_{rx},n_{tx},RS} + \alpha \cdot \hat{h}^c_{n_s,n_{rx},n_{tx},data} \right|^2 \right)$$

wherein $N_{RX}$ is a number of received antennas, $N_{slot}$ is a number of slots in a sub-frame, $N_{TX}$ is a number of transmit antennas, C is a set containing all valid codewords, $\hat{h}_{n_s,n_{rx},n_{tx},RS}$ represents an estimated channel on receiver antenna $n_{rx}$ for antenna port $n_{tx}$ on reference symbol, RS, belonging to slot $n_s$, $\hat{h}^c_{n_s,n_{rx},n_{tx},data}$ represents an estimated channel on receiver antenna $n_{rx}$ for antenna port $n_{tx}$ by RM codeword c on data symbols belonging to slot $n_s$, and α is a ratio of the number of data symbols to the number of RS symbols.

Similarly, although the illustrated user equipments 121 may represent communication devices that include any suitable combination of hardware and/or software, these user equipments 121 may, in particular embodiments, represent devices such as the example user equipment 121 illustrated in greater detail by FIG. 17.

As shown in FIG. 17, the example user equipments 121 comprises processing circuitry 1702, a memory 1703, radio circuitry 1701, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 1702 executing instructions stored on a computer-readable medium, such as the memory 1703 shown in FIG. 17. Alternative embodiments of the user equipments 121 may include additional components beyond those shown in FIG. 17 that may be responsible for providing certain aspects of the user equipments 121 functionality, including any of the functionality described above and/or any functionality necessary to support the solution described above.

To perform the method actions for arranging a Physical Uplink Control Channel, PUCCH, transmission to a network node 110, the user equipment 121 comprises the following arrangement depicted in FIG. 17. FIG. 17 is a diagrammatic view of an example of a user equipment 121 according to an embodiment.

The user equipment 121 comprises a processing circuitry 1702 configured to arrange the first bit or symbol sequence and at least second bit or symbol sequence such that at least two bits or symbols from the first bit or symbol sequence and at least second bit or symbol sequences that subsequently are Alamouti encoded together used the same RM codeword of the at least two RM codewords when being RM encoded, in order to enable control information encoded using one RM codeword to be processed independently from control information encoded using another RM codeword at the network node 110.

In some embodiments, the processing circuitry 1702 is configured to sort an order of bits in the first bit sequence and the at least second bit sequence. This may be performed according to an order described by the algorithm:

```
set i, j = 0
while i < 4 · N_sc^RB
    b_i = b̃_j, b_{i+1} = b̃_{j+1}, b_{i+2} = b̃_{j+2},
    b_{i+3} = b̃_{j+3}, b_{i+4} = b̃̃_j, b_{i+5} = b̃̃_{j+1},
    b_{i+6} = b̃̃_{j+2}, b_{i+7} = b̃̃_{j+3},
    i = i + 8,
    j = j + 4,
end while;
``` wherein $\tilde{b}_0, \tilde{b}_1, \tilde{b}_2, \ldots, \tilde{b}_{23}$ is the first bit sequence, $\tilde{\tilde{b}}_0, \tilde{\tilde{b}}_1, \tilde{\tilde{b}}_2, \ldots, \tilde{\tilde{b}}_{23}$ is the at least second bit sequence, $N_{sc}^{RB}=12$ is a number of subcarriers per resource block in the PUCCH transmission, and $b_0, b_1, b_2, \ldots, b_{B-1}$ is an output bit sequence to be scrambled, Quadrature Phase Shift Keying, QPSK, modulated and Alamouti encoded, before being pre-coded using a discrete Fourier transformation, DFT, and being transmitted in the PUCCH transmission.

Alternatively, the processing circuitry 1702 may be configured to sort an order of symbols of the first symbol sequence and the at least second symbol sequence, wherein first symbol sequence and the at least second symbol sequence comprises scrambled and Quadrature Phase Shift Keying, QPSK, modulated bits from a first bit sequence and the at least second bit sequence.

Furthermore, in some embodiments, the processing circuitry 1702 is further configured to apply the Alamouti encoding to the first symbol sequence and the at least second symbol sequence after the first symbol sequence and the at least second symbol sequence have been pre-coded using the discrete Fourier transformation, DFT. This may be performed by the processing circuitry 1702 being further configured to segment the first symbol sequence and the at least second symbol sequence before being pre-coded using the discrete Fourier transformation, DFT, wherein the segments are formed according to the algorithm described by:

$$\tilde{\tilde{s}}_{n_s}(n) = \frac{1}{\sqrt{L}} \left[ \sum_{l=0}^{\frac{L}{N_s}-1} \tilde{s}^{c=0}_{n_s \frac{L}{N_s}+l}(n) \exp\left(j2\pi \frac{nl}{N_{sc}^{RB}}\right) + \sum_{l=0}^{\frac{L}{N_s}-1} \tilde{s}^1_{n_s \frac{L}{N_s}+l}(n) \exp\left(j2\pi \frac{n \cdot (L/N_s+l)}{N_{sc}^{RB}}\right) \right]$$

wherein $N_s=2$ is a number of slots in a sub-frame, $n_s=0, \ldots, N_s-1$ is a slot index, $N_{sc}^{RB}=12$ is a number of subcarriers per resource block in the PUCCH transmission, $n=0, \ldots, N_{sc}^{RB}-1$ is a subcarrier index, $L=4$ is a used number of segments, $l=0, \ldots, L-1$ is a segment index, $c=0,1$ is a RM codeword index, $$\tilde{s}^c_{n_s \frac{L}{N_s}+l}(n)$$

is the repeated symbol $n=0, \ldots, N_{sc}^{RB}-1$ corresponding to segment $l=0, \ldots, L-1$, slot $n_s=0, \ldots, N_s-1$ and RM codeword $c=0,1$.

It should also be noted that it is an important advantage of some embodiments herein that they enable low complexity implementation of maximum likelihood (ML) detectors for dual RM encoders. Also, it is an important advantage of some embodiments herein that they are able to limit the number of ML hypotheses to $2^{n1}+2^{n2}$, where n1 and n2 are the number of information bits for each of the two dual RM encoders.

In the above description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein may represent conceptual views of illustrative circuitry or other functional units embodying the principles of the technology. Similarly, it will be appreciated that any flow charts, state transition diagrams, pseudo-code, and the like represent various processes which may be substantially represented in computer readable medium and so executed by a computer or processor, whether or not such computer or processor is explicitly shown.

The functions of the various elements including functional blocks, including but not limited to those labelled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analogue) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

Further Discussions

Furthermore, according to on-going standardization discussions, guidelines are concluded on the selection of transmit diversity schemes for PUCCH Format 3. These guidelines are essentially as follows:

PUCCH overhead as close as possible to single antenna case,

Performance significantly improved compared to single antenna and as close as possible SORTD, Minimize the specification impact, Consider cases with and without antenna gain imbalance, Take inter-cell interference into account, and Consider both normal and extended CP.

Several candidate schemes have been presented which have the same resource overhead as the single antenna case. A way forward agreed on is to make an additional system level analysis of the overhead and an email discussion has been done on the methodology for performing such analysis.

The following section shows the trade-off analysis for the introduction of a resource efficient transmit diversity scheme, that is, for example, the arranging and receiving of a PUCCH transmission as described in some of the embodiments above. An overhead analysis discussion is followed by some further evaluation results and insights of using a resource efficient transmit diversity scheme for PUCCH Format 3. This analysis gives support to the resource efficient transmit diversity scheme presented herein, that is, the arranging and receiving of a PUCCH transmission as described in some of the embodiments above.

Assuming a transmit diversity scheme with the same resource allocation, but with significant performance benefit over the single antenna operation makes it obvious that this is attractive to use whenever the user equipment 121 has a capability of using multi-antenna transmission, that is, using at least two (2) antennas. In the configuration of PUCCH Format 3 resources in a cell, the network node 110 does not need to distinguish between user equipments 121 of different capability if the resource efficient transmit diversity scheme described herein, that is, the arranging and receiving of PUCCH transmissions as described in at least some of the embodiments above, is introduced.

Furthermore, when using the arranging and receiving of PUCCH transmissions as described in at least some of the embodiments above and the number of user equipments 121 with multi-antenna capability fluctuates in the cell, there is no impact on the resource allocation procedure. This is an attractive feature.

It is therefore questionable if, for example, SORTD for the PUCCH Format 3, ever will be used in a real telecommunications network, due to the double resource overhead and the additional resource configuration and re-configuration complexity. Regarding SORTD, in this case, the benefits in performance are not very large, as is seen below.

Hence, for a PUCCH Format 3, the resource efficient transmit diversity scheme described herein, that is, the arranging and receiving of PUCCH transmissions as described in at least some of the embodiments above, may well be frequently used. Also, introducing it in the Rel.11 time-frame goes hand in hand with a likely larger population of user equipments 121 with UL MIMO capability as compared to Rel.10 and the use of carrier aggregation. This is provided that PUCCH Format 3 will be an extensively used PUCCH Format.

The scenarios wherein a PUCCH Format 3 is expected to be used are the aggregation of >2 DL carriers and TDD with DL heavy configurations. This requires PUCCH Format 3 for A/N (ACK/NACK) feedback. This is also the case of a single component carrier (CC). There is further a vast number of contributions from different companies mentioning different other uses of the PUCCH Format 3 and extensions thereof. For example, Channel State Indication/Information (CSI-FAN) feedback. In such cases, PUCCH Format 3 resources need to be reserved as well; in some proposals also semi-statically. The latter even more emphasizes the need for a resource efficient transmit diversity scheme as described herein, that is, the arranging and receiving of PUCCH transmissions as described in at least some of the embodiments above.

Thus, a more frequent use of the PUCCH Format 3 is likely in the future, where aggregation of more carriers and extended use of the PUCCH Format 3 may become reality. Because of the attractiveness of a resource efficient transmit diversity scheme from a resource allocation complexity perspective and the benefits compared to single antenna operation, the resource efficient transmit diversity scheme for a PUCCH Format 3, that is, the arranging and receiving of PUCCH transmissions as described in at least some of the embodiments above, which uses one PUCCH Format 3 resource is proposed herein.

Further evaluation results of the performance of the resource efficient transmit diversity scheme described herein, that is, the arranging and receiving of PUCCH transmissions as described in at least some of the embodiments above, is provided below. This is under the assumption of realistic channel and realistic noise and interference covariance estimation. In the results of this section, a PUCCH detector is used, that is, channel estimation followed by Maximum-Likelihood (ML) decoding.

The required operating Signal to Noise Ratio (SNR) for the resource efficient transmit diversity scheme described herein, that is, the arranging and receiving of PUCCH transmissions as described in at least some of the embodiments above, and the other conventional transmit diversity schemes are determined based on the following performance requirements:

$$Pr(PUCCH\ DTX \rightarrow ACK\ bits) =$$
$$\frac{\#(false\ ACK\ bits)}{\#(PUCCH\ DTX) \times \#(ACK/NAK\ bits)} \leq 10^{-2}$$
$$Pr(NAK\ or\ DTX\ bits \rightarrow ACK\ bits) \leq 10^{-3}$$
$$Pr(ACK\ bits \rightarrow NAK\ bits\ or\ DTX) \leq 10^{-2}$$

The receiver detection threshold are set such that $$Pr(PUCCH\ DTX \rightarrow ACK\ bits) = 10^{-2}$$

The operating SNRs is taken as the larger of those required for achieving $$Pr(ACK\ bits \rightarrow NAK\ bits\ or\ DTX) = 10^2\ and$$

$$Pr(NAK\ or\ DTX\ bits \rightarrow ACK\ bits) = 10^{-3}$$

According to the PUCCH Format 3 specifications, there is a per SC-FDMA symbol cell specific randomization of the cyclic shifts with a periodicity of 20 slots. This was introduced in Rel.10 to mitigate inter-cell interference. When transmit diversity is used, this randomization gives performance benefits also without intercell interference, for all transmit diversity schemes with varying gains.

Figure 18:
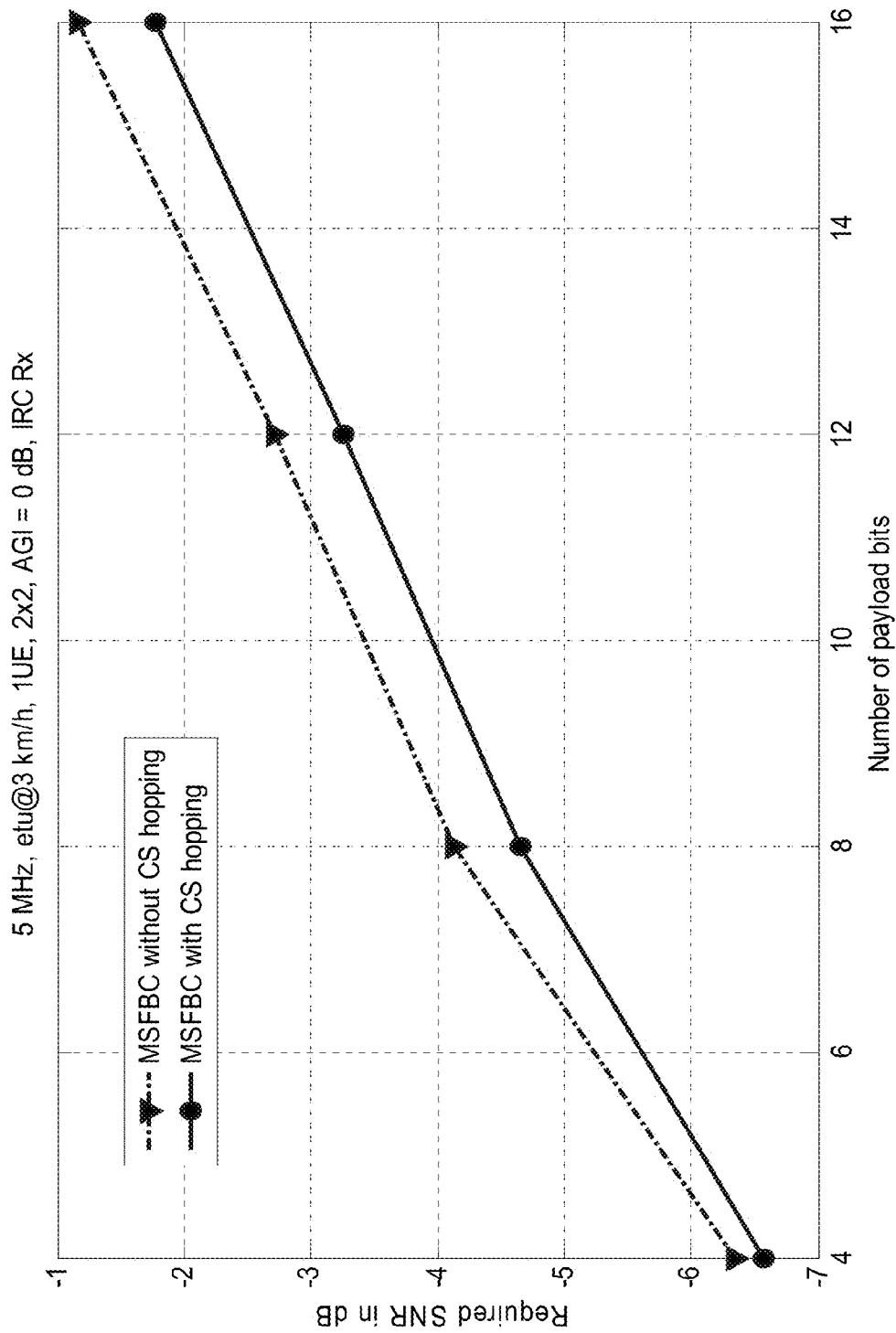
FIG. 18 is a graphical view illustrating, e.g., impact of cyclic shift hopping on diversity performance on MSFBC.

An example of the gain for a resource efficient transmit diversity scheme described herein, that is, the arranging and receiving of PUCCH transmissions as described in at least some of the embodiments above and referred to above as MSFBC, can be seen in FIG. 18. Hence, since this randomization has a large impact on the relative performance between the transmit diversity schemes, it is important to include this randomization from the PUCCH Format 3 specification in the evaluations.

Performance with Zero AGI

Figure 19:
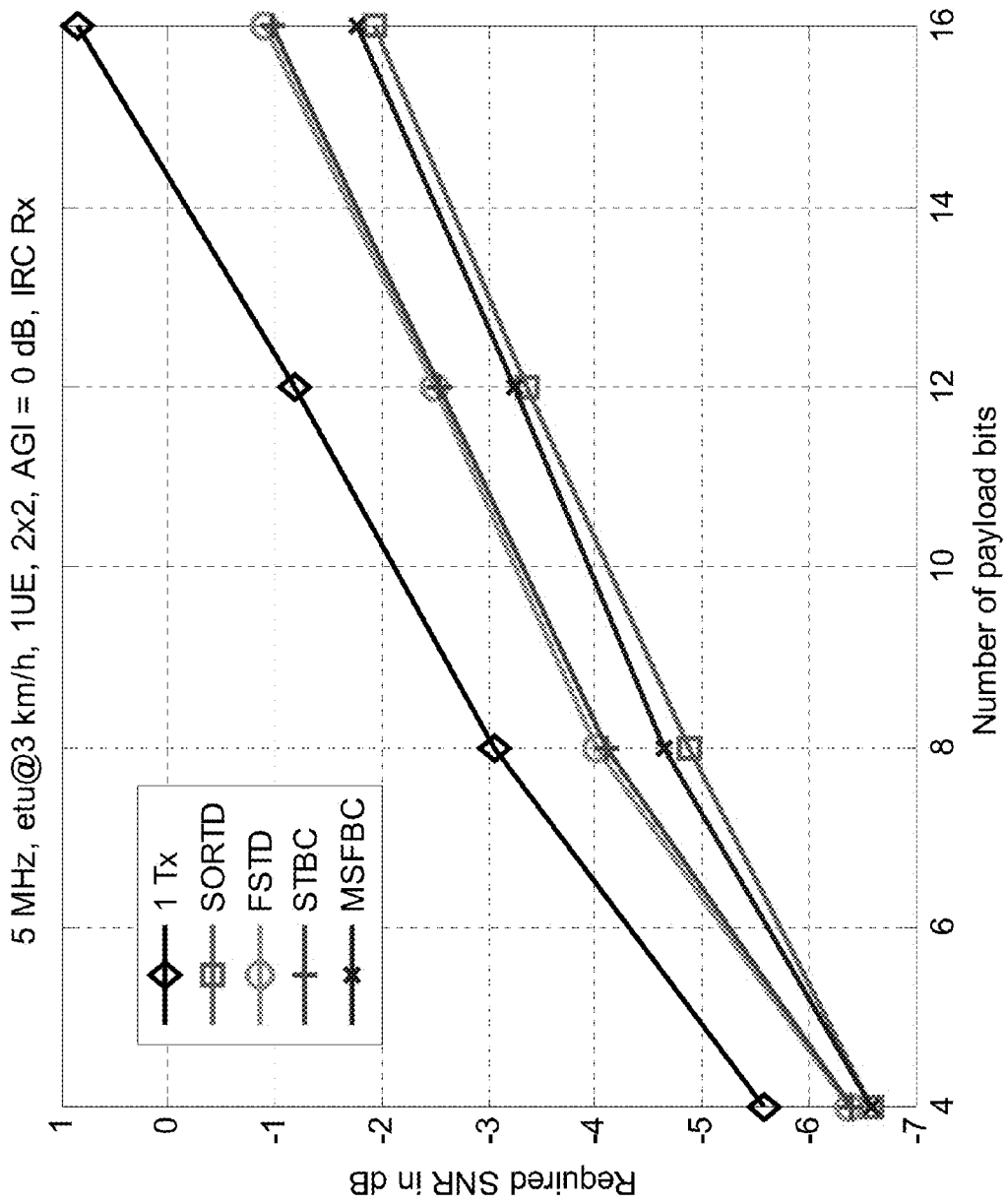
FIG. 19 is a graphical view illustrating, e.g., simulation results in 2×2 ETU channel with normal receiver (AGI=0 dB. No interference).
Figure 20:
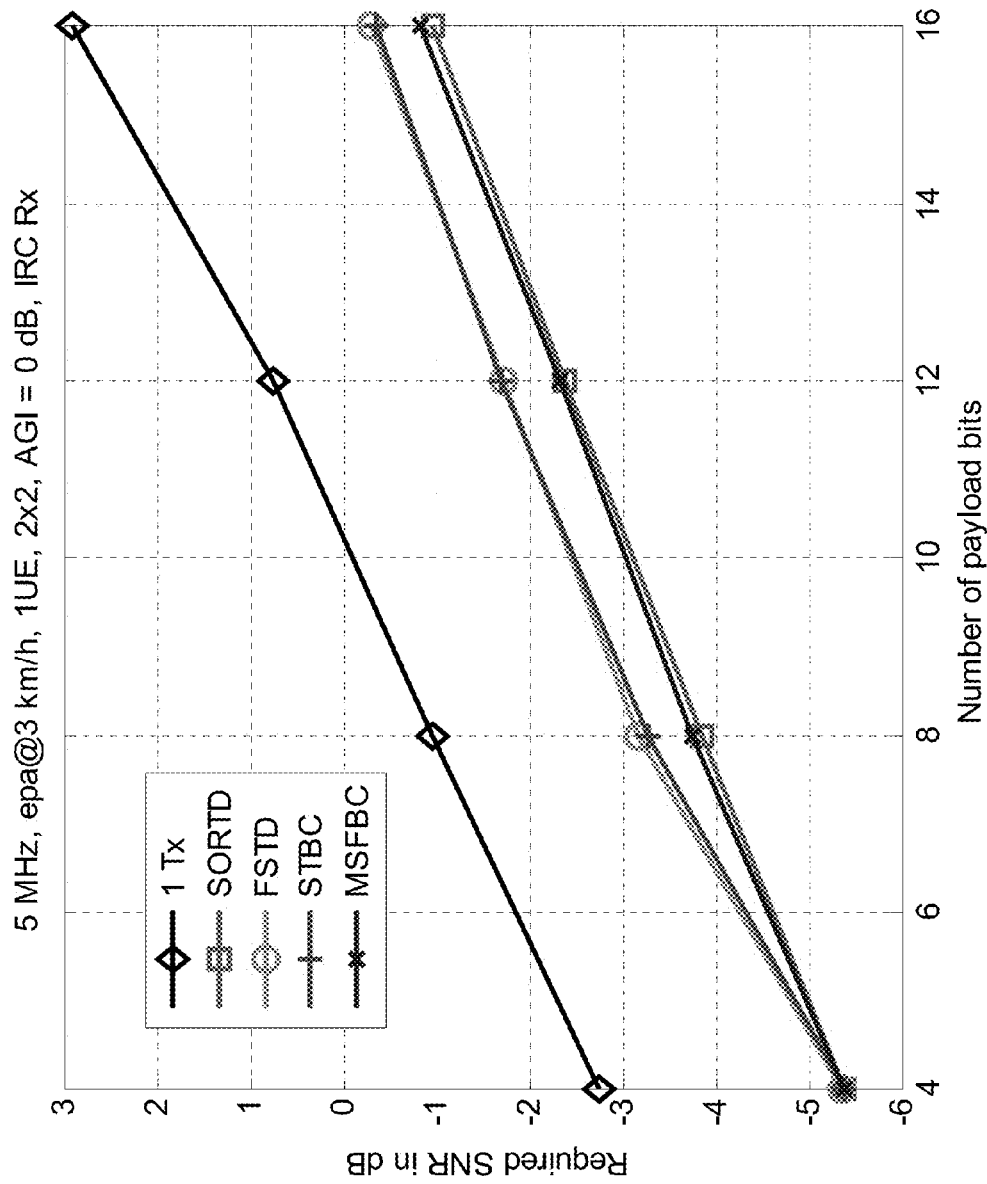
FIG. 20 is a graphical view illustrating, e.g., simulation results in 2×2 EPA channel with normal receiver (AGI=0 dB. No interference).

In FIG. 19 and FIG. 20, it should be noted that a resource efficient transmit diversity scheme described herein, that is, the arranging and receiving of PUCCH transmissions as described in at least some of the embodiments above and referred to above as MSFBC, has performances very close to SORTD, and that a further resource efficient transmit diversity schemes described herein, that is, the arranging and receiving of PUCCH transmissions as described in at least some of the embodiments above and referred to above as STBC, is within 1 dB of SORTD. The benefits for these resource efficient transmit diversity schemes described herein, that is, the arranging and receiving of PUCCH transmissions as described in at least some of the embodiments above, over a single antenna transmission is 1-2.8 dB for ETU and 2-4 dB for EPA channel depending on the payload.

Performance with Nonzero AGI

When the user equipment 121 is a handheld terminal, there is a risk of antenna gain imbalance if, for example, the user of the handheld terminal is shielding one of the antennas with its hand. This will impede the UL MIMO performance. Thus, this should be prevented by the user equipment 121 design. However, if it occurs, it is easily detected by the network node 110, since it performs channel measurements from each user equipment 121 antenna. It may thereby re-configure the user equipment 121 in single antenna operation whenever this occurs. During the time it takes to perform RRC reconfiguration, the user equipment 121 need to operate with a nonzero AGI and it is therefore worth to see the effects on the performances of the resource efficient transmit diversity schemes described herein, that is, the arranging and receiving of PUCCH transmissions as described in at least some of the embodiments above, in comparison to the other transmit diversity schemes.

Figure 21:
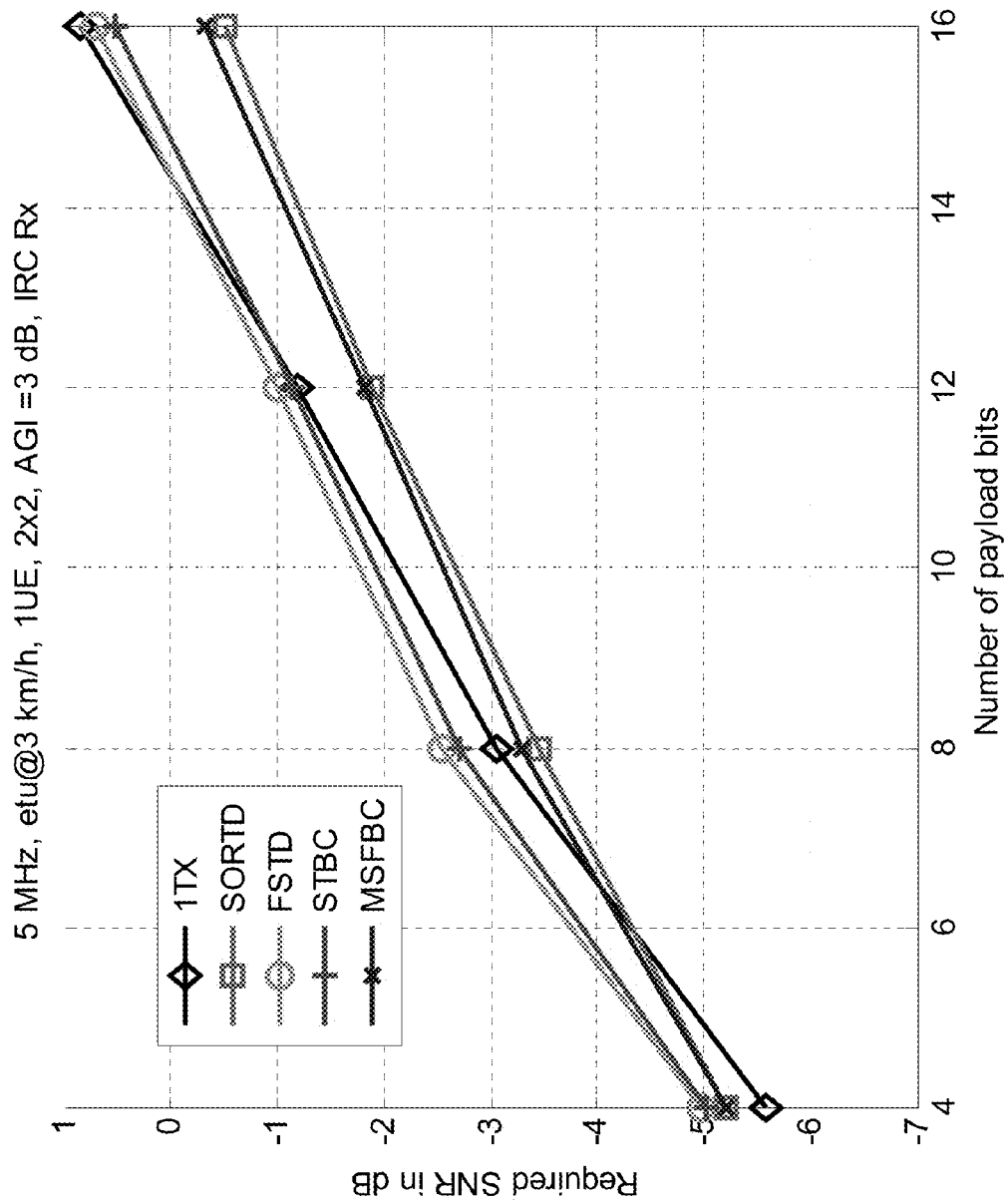
FIG. 21 is a graphical view illustrating, e.g., performance due to 3 dB AAG.

As seen in FIG. 21, there is a slight loss in performance for the resource efficient transmit diversity scheme STBC, for smaller payloads compared to single antenna operation for AGI=3 dB.

The resource efficient transmit diversity scheme MSFBC and SORTD also degrades in performance, but still has better performance than single antenna operation except in the 4 bit case.

Use of Advanced Receivers

Figure 22:
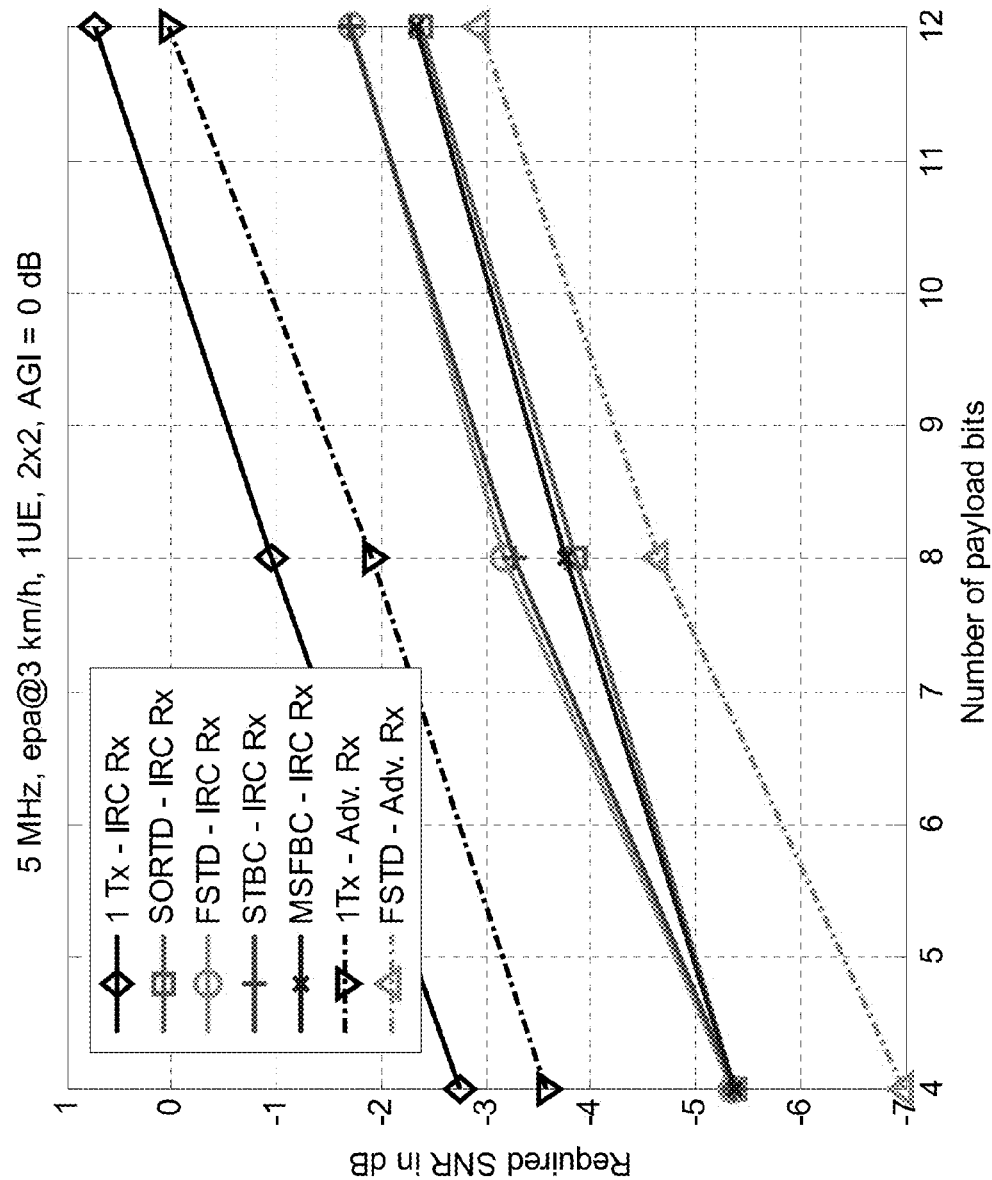
FIG. 22 is a graphical view illustrating performance of advanced receiver in EPA channel.
Figure 23:
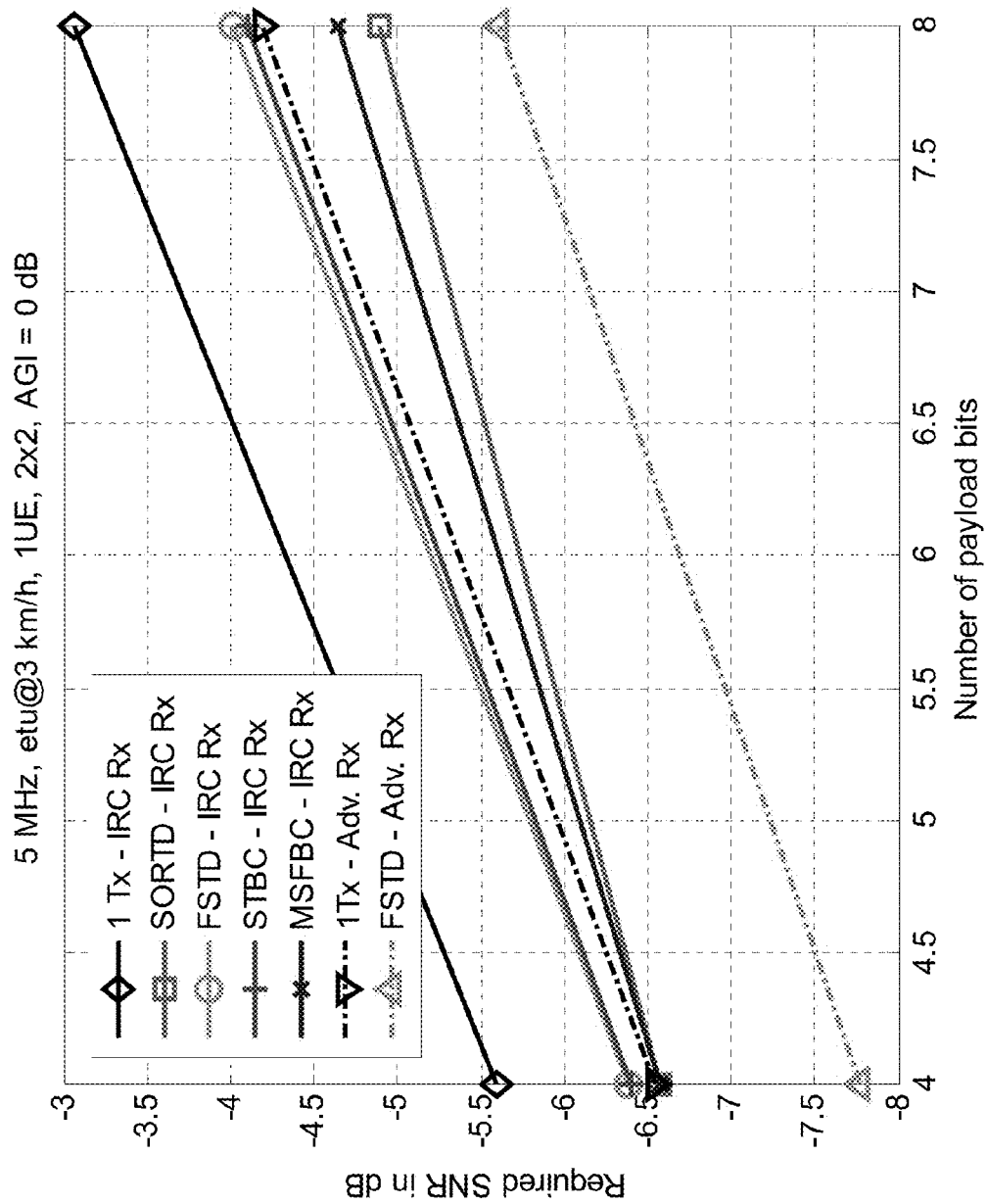
FIG. 23 is a graphical view illustrating performance of advanced receiver in ETU channel.

The performances of the joint ML detection using both data and RS were earlier investigated. The benefits over the "normal" detector which estimates the channel first based on the RS and then use the obtained channel estimate in the detector is about 1 dB for the single transmit antenna and 1.5 dB for frequency switched transmit diversity (FSTD), see FIG. 22 and FIG. 23.

However, these gains come naturally with a complexity cost. It is therefore important in the resource efficient transmit diversity schemes STBC and MSFBC described herein, that is, the arranging and receiving of PUCCH transmissions as described in at least some of the embodiments above and referred to as STBC and MSFBC, that the separated ML detection processing per codeword for the PUCCH Format 3 single antenna detector, which is possible due to the dual RM encoders, also may be applied to the transmit diversity of the PUCCH Format 3. Otherwise, the number of hypotheses in the ML detector becomes $2^{n1+n2}$, instead of $2^{n1}+2^{n2}$ as desired. Here, n1 and n2 is the payload of each of the RM encoders, respectively.

This gives a disadvantage to the resource efficient transmit diversity schemes MSFBC and STBC, since bits of the two codewords are mixed in the Alamouti encoding. This prohibits its implementation of advanced receivers except for the smallest payloads. The frequency switched transmit diversity (FSTD) inherently has a structure that allows for separate codeword processing and with the advanced receiver, FSTD has the best performance of all single resource transmit diversity schemes.

As an observation, FSTD may benefit from practically realizable advanced receivers by independent processing of the two codewords with a link gain of 1.5 dB. The use of single resource Format 3 TxD has been discussed and there is a potential increased use of Format 3 in Rel.11.

Some main features of Rel.11 terminals compared to Rel.8 terminals are the support for carrier aggregation (CA) and UL MIMO. Taking into account of the time-frame for Rel.11 terminal availability, it is likely that multi-antenna support is common. Furthermore, the single resource transmit diversity (TxD) has the benefit of not impacting on the resource configuration since a single and multi-antenna user equipment needs the same amount of resources.

Conventional MSFBC has superior performance but has the drawback that separate processing of the two dual RM codewords for payload sizes>11 bits is not possible and it prohibits implementation of advanced receivers. Further, conventional STBC also has this drawback but realizable advanced detectors are possible for FSTD. Thus, separate processing according to the embodiments described above is crucial for the dual RM encoded PUCCH Format 3, and was one of the arguments to introduce the dual RM codes. Due to these facts and the close, that is, less than 1 dB, performance compared to SORTD, the embodiments disclosed herein proposes, for example, to introduce STD for PUCCH Format 3.

Although the description above contains many specifics, these should not be construed as limiting the scope of the technology disclosed herein but as merely providing illustrations of some of the presently preferred embodiments. It will be appreciated that the scope hereof fully encompasses other embodiments which may become obvious to those skilled in the art, and that the scope is accordingly not to be limited.

In other words, the embodiments herein are not limited to the above described preferred embodiments. Various alternatives, modifications and equivalents may be used. Therefore, the above embodiments should not be construed as limiting the scope.

Reference to an element in the singular is not intended to mean "one and only one" unless explicitly so stated, but rather "one or more".

All structural and functional equivalents to the elements of the above-described embodiments that are known to those of ordinary skill in the art are expressly incorporated herein by reference and are intended to be encompassed hereby.

When using the word "comprise" or "comprising" it shall be interpreted as non-limiting, i.e. meaning "consist at least of".

ABBREVIATIONS

ACK Acknowledgement
ARQ Automatic Repeat Request
CA Carrier Aggregation
CIF Carrier Indicator Field
CAZAC Constant Amplitude Zero Auto Correlation
CC Component Carrier
DCI Downlink Control Information
FSTD Frequency Switched Transmit Diversity
HARQ Hybrid Automatic Repeat Request
LTE Long term evolution
MAC Medium Access Control
MIMO Multiple-Input Multiple-Output
NACK Non Acknowledgement
OFDM Orthogonal Frequency Division Multiple Access
PCC Primary Component Carrier
PDCCH Physical Downlink Control CHannel
PUCCH Physical Uplink Control Channel
SFBC Space Frequency Block Coding
MSFBC Modified Space Frequency Block Coding
STBC Space Time Block Coding
SCC Secondary Component Carrier
TPC Transmit Power Control
TxD Transmit Diversity
UE User equipment

The invention claimed is:

1. A method in a user equipment for arranging a Physical Uplink Control Channel, PUCCH, transmission to a network node in a telecommunications system, in which the PUCCH transmission comprises control information for use in downlink carrier transmissions, in which the control information is Reed-Müller, RM, encoded using at least two RM codewords and transmitted using Alamouti encoded transmit diversity over at least two antenna ports, and wherein
  the control information comprises a first bit or symbol sequence and at least a second bit or symbol sequence, the method comprising
  arranging the first bit or symbol sequence and at least second bit or symbol sequence, such that at least two bits or symbols from the first bit or symbol sequence and at least second bit or symbol sequence, that subsequently are Alamouti encoded together, originate from the same RM codeword of the at least two RM codewords, in order to enable control information encoded using one RM codeword to be processed independently from control information encoded using another RM codeword at the network node.

2. The method according to claim 1, wherein the arranging comprises sorting an order of bits in the first bit sequence and the at least second bit sequence.

3. The method according to claim 2, wherein the order is according to an algorithm described by:

$$
\begin{aligned}
&\text{set } i, j = 0 \\
&\text{while } i < 4 \cdot N_{sc}^{RB} \\
&\quad b_i = \bar{b}_j, \\
&\quad b_{i+1} = \bar{b}_{j+1}, \\
&\quad b_{i+2} = \bar{b}_{j+2}, \\
&\quad b_{i+3} = \bar{b}_{j+3}, \\
&\quad b_{i+4} = \tilde{b}_j, \\
&\quad b_{i+5} = \tilde{b}_{j+1}, \\
&\quad b_{i+6} = \tilde{b}_{j+2}, \\
&\quad b_{i+7} = \tilde{b}_{j+3}, \\
&\quad i = i + 8, \\
&\quad j = j + 4, \\
&\text{end while;}
\end{aligned}
$$

wherein
  $\bar{b}_0, \bar{b}_1, \bar{b}_2, \ldots, \bar{b}_{23}$ is the first bit sequence,
  $\tilde{b}_0, \tilde{b}_1, \tilde{b}_2, \ldots, \tilde{b}_{23}$ is the at least second bit sequence,
  $N_{sc}^{RB}=12$ is a number of subcarriers per resource block in the PUCCH transmission, and
  $b_0, b_1, b_2, \ldots, b_{B-1}$ is an output bit sequence to be scrambled, Quadrature Phase Shift Keying, QPSK, modulated and Alamouti encoded, before being precoded using a discrete Fourier transformation, DFT, and being transmitted in the PUCCH transmission.

4. The method according to claim 1, wherein the arranging comprises sorting an order of symbols of the first symbol sequence and the at least second symbol sequence, wherein first symbol sequence and the at least second symbol sequence comprises scrambled and Quadrature Phase Shift Keying, QPSK, modulated bits from a first bit sequence and an at least second bit sequence.

5. The method according to claim 4, wherein the arranging further comprises
applying an Alamouti encoding to the first symbol sequence and the at least second symbol sequence after the first symbol sequence and the at least second symbol sequence have been pre-coded using the discrete Fourier transformation, DFT.

6. The method according to claim 4, wherein the arranging further comprises
segmenting the first symbol sequence and the at least second symbol sequence before being pre-coded using the discrete Fourier transformation, OFT, wherein the segments are formed according to the algorithm described by:

$$\tilde{\tilde{s}}_{n_s}(n) = \frac{1}{\sqrt{L}} \left[ \sum_{l=0}^{\frac{L}{N_s}-1} \tilde{s}^{c=0}_{n_s \frac{L}{N_s}+l}(n) \exp\left(j2\pi \frac{nl}{N_{sc}^{RB}}\right) + \sum_{l=0}^{\frac{L}{N_s}-1} \tilde{s}^{1}_{n_s \frac{L}{N_s}+l}(n) \exp\left(j2\pi \frac{n \cdot (L/N_s + l)}{N_{sc}^{RB}}\right) \right]$$

wherein
$N_s=2$ is a number of slots in a sub-frame,
$n_s=0, \ldots, N_s-1$ is a slot index,
$N_{sc}^{RB}=12$ is a number of subcarriers per resource block in the PUCCH transmission,
$n=0, \ldots, N_{sc}^{RB}-1$ is a subcarrier index,
L=4 is a used number of segments,
L=0, \ldots, L-1 is a segment index,
c=0,1 is an RM codeword index, $$\tilde{s}^{c}_{n_s \frac{L}{N_s}+l}(n)$$

is the repeated symbol $n=0, \ldots, N_{sc}^{RB}-1$ corresponding to segment $l=0, \ldots, L-1$, slot $n_s=0, \ldots, N_s-1$ and RM codeword c=0,1.

7. The method according to claim 1, wherein control information encoded using one of the at least two RM codewords comprises information bits of Hybrid Automatic Repeat Request-Acknowledgment (HARQ-ACK) information, and control information encoded using the other of the at least two RM codewords comprises information bits of channel state information.

8. A user equipment for arranging a Physical Uplink Control Channel, PUCCH, transmission to a network node in a telecommunications system, in which the PUCCH transmission comprises control information for use in downlink carrier transmissions, in which the control information is Reed-Müller, RM, encoded using at least two RM codewords and transmitted using Alamouti encoded transmit diversity over at least two antenna ports, and wherein
the control information comprises a first bit or symbol sequence and at least a second bit or symbol sequence, the user equipment comprising a processing circuitry configured to arrange the first bit or symbol sequence and at least second bit or symbol sequence, such that at least two bits or symbols from the first bit or symbol sequence and at least second bit or symbol sequences, that subsequently are Alamouti encoded together, originate from the same RM codeword of the at least two RM codewords, in order to enable control information encoded using one RM codeword to be processed independently from control information encoded using another RM codeword at the network node.

9. The user equipment according to claim 8, wherein the processing circuitry is further configured to sort an order of bits in the first bit sequence and the at least second bit sequence.

10. The user equipment according to claim 9, wherein the order is according to the algorithm described by:

--- set i, j = 0
while i < 4 · $N_{sc}^{RB}$
$b_i = \tilde{b}_j$,
$b_{i+1} = \tilde{b}_{j+1}$,
$b_{i+2} = \tilde{b}_{j+2}$,
$b_{i+3} = \tilde{b}_{j+3}$,
$b_{i+4} = \tilde{\tilde{b}}_j$,
$b_{i+5} = \tilde{\tilde{b}}_{j+1}$,
$b_{i+6} = \tilde{\tilde{b}}_{j+2}$,
$b_{i+7} = \tilde{\tilde{b}}_{j+3}$,
i = i + 8,
j = j + 4,
end while;

--- wherein
$\tilde{b}_0, \tilde{b}_1, \tilde{b}_2, \ldots, \tilde{b}_{23}$ is the first bit sequence,
$\tilde{\tilde{b}}_0, \tilde{\tilde{b}}_1, \tilde{\tilde{b}}_2, \ldots, \tilde{\tilde{b}}_{23}$ is the at least second bit sequence,
$N_{sc}^{RB}=12$ is a number of subcarriers per resource block in the PUCCH transmission, and
$b_0, b_1, b_2, \ldots, b_{B-1}$ is an output bit sequence to be scrambled, Quadrature Phase Shift Keying, QPSK, modulated and Alamouti encoded, before being pre-coded using a discrete Fourier transformation, DFT, and being transmitted in the PUCCH transmission.

11. The user equipment according to claim 8, wherein the processing circuitry is further configured to sort an order of symbols of the first symbol sequence and the at least second symbol sequence, wherein first symbol sequence and the at least second symbol sequence comprises scrambled and Quadrature Phase Shift Keying, QPSK, modulated bits from a first bit sequence and the at least second bit sequence.

12. The user equipment according to claim 11, wherein the processing circuitry is further configured to apply the Alamouti encoding to the first symbol sequence and the at least second symbol sequence after the first symbol sequence and the at least second symbol sequence have been pre-coded using the discrete Fourier transformation, DFT.

13. The user equipment according to claim 11, wherein the processing circuitry is further configured to segment the first symbol sequence and the at least second symbol sequence before being pre-coded using the discrete Fourier transformation, DFT, wherein the segments are formed according to the algorithm described by:

$$\tilde{\tilde{s}}_{n_s}(n) = \frac{1}{\sqrt{L}} \left[ \sum_{l=0}^{\frac{L}{N_s}-1} \tilde{s}^{c=0}_{n_s \frac{L}{N_s}+l}(n) \exp\left(j2\pi \frac{nl}{N_{sc}^{RB}}\right) + \right.$$

$$\left. \sum_{l=0}^{\frac{L}{N_s}-1} \tilde{s}^{1}_{n_s \frac{L}{N_s}+l}(n) \exp\left(j2\pi \frac{n\cdot(L/N_s+l)}{N_{sc}^{RB}}\right) \right]$$

wherein
$N_s=2$ is a number of slots in a sub-frame,
$n_s=0, \ldots, N_s-1$ is a slot index,
$N_{sc}^{RB}=12$ is a number of subcarriers per resource block in the PUCCH transmission,
$n=0, \ldots, N_{sc}^{RB}-1$ is a subcarrier index,
$L=4$ is a used number of segments,
$l=0, \ldots, L-1$ is a segment index,
$c=0,1$ is an RM codeword index, $$\tilde{s}^{c}_{n_s \frac{L}{N_s}+l}(n)$$

is the repeated symbol $n=0, \ldots, N_{sc}^{RB}-1$ corresponding to segment $l=0, \ldots, L-1$, slot $n_s=0, \ldots, N_s-1$ and RM codeword $c=0,1$.

14. A method in a network node for receiving a Physical Uplink Control Channel, PUCCH, transmission from a user equipment in a telecommunications system, in which the PUCCH transmission comprises control information for use in downlink carrier transmissions, in which the control information is Reed-Müller, RM, encoded using at least two RM codewords and transmitted using Alamouti encoded transmit diversity over at least two antenna ports, the method comprising
  receiving the PUCCH transmission from a user equipment via at least two antenna ports, and
  processing the control information such that control information encoded using one RM codeword is processed independently from control information encoded using another RM codeword.

15. The method according to claim 14, wherein the processing comprises
  performing a maximum likelihood detection for each of the at least two RM codewords according to the algorithm described by:

$$\hat{c} = \underset{c \in C}{\operatorname{argmax}} \left( \sum_{n_{rx}=0}^{N_{RX}-1} \sum_{n_s=0}^{N_{slot}-1} \sum_{n_{tx}=0}^{N_{TX}-1} \left| \hat{h}_{S_S, n_{rx}, n_{tx}, RS} + \alpha \cdot \hat{h}^c_{n_s, n_{rx}, n_{tx}, data} \right| \right)$$

wherein
  $N_{RX}$ is a number of received antennas,
  $N_{slot}$ is a number of slots in a sub-frame,
  $N_{TX}$ is a number of transmit antennas,
  C is a set containing all valid codewords,
  $\hat{h}_{n_s, n_{rx}, n_{tx}, RS}$ represents an estimated channel on receiver antenna $n_{rx}$ for antenna port $n_{tx}$ on reference symbol, RS, belonging to slot $n_s$, $\hat{h}^c_{n_s, n_{rx}, n_{tx}, data}$ represents an estimated channel on receiver antenna $n_{rx}$ for antenna port $n_{tx}$ by RM codeword c on data symbols belonging to slot $n_s$, and
  $\alpha$ is a ratio of the number of data symbols to the number of RS symbols.

16. A network node for receiving a Physical Uplink Control Channel, PUCCH, transmission from a user equipment in a telecommunications system, in which the PUCCH transmission comprises control information for use in downlink carrier transmissions, in which the control information is Reed-Müller, RM, encoded using at least two RM codewords and transmitted using Alamouti encoded transmit diversity over at least two antenna ports, the network node comprising
  a processing circuitry configured to receive the PUCCH transmission from a user equipment via at least two antenna ports, and process the control information such that control information encoded using one RM codeword is processed independently from control information encoded using another RM codeword.

17. The network node according to claim 16, the processing circuitry is further configured to perform a maximum likelihood detection for each of the at least two RM codewords according to the algorithm described by:

$$\hat{c} = \underset{c \in C}{\operatorname{argmax}} \left( \sum_{n_{rx}=0}^{N_{RX}-1} \sum_{n_s=0}^{N_{slot}-1} \sum_{n_{tx}=0}^{N_{TX}-1} \left| \hat{h}_{S_S, n_{rx}, n_{tx}, RS} + \alpha \cdot \hat{h}^c_{n_s, n_{rx}, n_{tx}, data} \right| \right)$$

wherein
  $N_{RX}$ is a number of received antennas,
  $N_{slot}$ is a number of slots in a sub-frame,
  $N_{TX}$ is a number of transmit antennas,
  C is a set containing all valid codewords,
  $\hat{h}_{n_s, n_{rx}, n_{tx}, RS}$ represents an estimated channel on receiver antenna $n_{rx}$ for antenna port $n_{tx}$ on reference symbol, RS, belonging to slot $n_s$, $\hat{h}^c_{n_s, n_{rx}, n_{tx}, data}$ represents an estimated channel on receiver antenna $n_{rx}$ for antenna port $n_{tx}$ by RM codeword c on data symbols belonging to slot $n_s$, and
  $\alpha$ is a ratio of the number of data symbols to the number of RS symbols.

* * * * *